(12) United States Patent
Tsui

(10) Patent No.: US 7,873,442 B2
(45) Date of Patent: *Jan. 18, 2011

(54) SYSTEM AND METHOD FOR MANAGING AND OPTIMIZING POWER USE

(75) Inventor: Jonah Tsui, Bellevue, WA (US)

(73) Assignee: The Energy Authority, Inc., Jacksonville, FL (US)

( * ) Notice: Subject to any disclaimer, the term of this patent is extended or adjusted under 35 U.S.C. 154(b) by 1015 days.

This patent is subject to a terminal disclaimer.

(21) Appl. No.: 11/380,401

(22) Filed: Apr. 26, 2006

(65) Prior Publication Data

US 2006/0206240 A1 Sep. 14, 2006

Related U.S. Application Data

(63) Continuation-in-part of application No. 10/152,088, filed on May 20, 2002, now Pat. No. 7,089,190.

(60) Provisional application No. 60/675,342, filed on Apr. 26, 2005.

(51) Int. Cl.
*G05D 11/00* (2006.01)
*G05F 1/10* (2006.01)
*G05F 1/66* (2006.01)
*G06Q 10/00* (2006.01)

(52) U.S. Cl. .................... 700/291; 700/297; 705/1.1

(58) Field of Classification Search ................ 700/286, 700/291, 295, 297; 705/1, 7, 8, 10, 1.1; 323/234, 323/299, 304, 318; 706/21, 907, 915
See application file for complete search history.

(56) References Cited

U.S. PATENT DOCUMENTS

| | | | | |
|---|---|---|---|---|
| 5,974,403 A * | 10/1999 | Takriti et al. | ................. | 705/412 |
| 6,021,402 A * | 2/2000 | Takriti | ................. | 705/412 |
| 6,785,592 B1* | 8/2004 | Smith et al. | ................. | 700/291 |
| 7,177,728 B2* | 2/2007 | Gardner | ................. | 700/295 |
| 7,406,364 B2* | 7/2008 | Andren et al. | ................. | 700/286 |
| 2003/0050738 A1* | 3/2003 | Masticola et al. | ................. | 700/291 |
| 2004/0215529 A1* | 10/2004 | Foster et al. | ................. | 705/26 |
| 2004/0249775 A1* | 12/2004 | Chen | ................. | 706/21 |
| 2004/0254899 A1* | 12/2004 | Abe et al. | ................. | 705/412 |
| 2004/0257858 A1* | 12/2004 | Mansingh et al. | ................. | 365/154 |
| 2005/0015283 A1* | 1/2005 | Iino et al. | ................. | 705/4 |
| 2005/0165511 A1* | 7/2005 | Fairlie | ................. | 700/286 |
| 2005/0246220 A1* | 11/2005 | Thomson et al. | ................. | 705/10 |

* cited by examiner

*Primary Examiner*—M. N. Von Buhr
(74) *Attorney, Agent, or Firm*—Jellett Law PS.

(57) ABSTRACT

A system and method to optimize the use of utility power. The system and method obtains real-time and scheduled data. The data is saved into a database. An application is run to optimize the use of the utility power based on forecasted load requirements and available resources. A schedule is produced after optimizing the desired use for the utility power for a given user.

39 Claims, 27 Drawing Sheets

FIG. 7

| | A | B | C | D | E | F | G | H |
|---|---|---|---|---|---|---|---|---|
| 1 | Benton County PUD | | Friday | | 01/02/04 | | | |
| 2 | | | | | | | | |
| 3 | <<Pre-Schedule Slice Data From BPA>> | | | | | | | |
| 4 | | | | MW | MW-day | MWh | MWa | |
| 5 | 1 hr Slice System Max | | | ##### | | | (MinLLH) | |
| 6 | 16 hr Slice System Sustained Max | | | 12,504 | | 200,058 | | |
| 7 | 1 hr Max - Snake Only | | | 1,527 | | | Full Screen | |
| 8 | 16 hr Sustained Max - Snake Only | | | 408 | | 6529 | CloseFullScreen | |
| 9 | 1 hr Slice System Min | | | 4064 | | | | |
| 10 | 8 hr Slice System Sustained Min | | | 3851 | | | | |
| 11 | Daily System Max | | | | 10,872 | 260,982 | 3,851 | |
| 12 | Daily System Min | | | | 7,488 | 179,719 | 7,609 | |
| 13 | Slice Share of Generation From Passing Inflow | | | | 136 | 3,265 | 3,851 | |
| 14 | Day Ending Slice System Storage 2 Days Ago | | | | 0 | | | |
| 15 | Slice Share Storage of 2 Days Ago | | | | 0 | | | |
| 16 | System Pondage Up | | | | 2,207 | 52,958 | | |
| 17 | System Pondage Down | | | | -4,605 | -110,523 | | |
| 18 | << Storage Bounds Adjusted To Slice %>> | | | | 1/2 | 1/1 | 12/31 | |
| 19 | Upper Bound Adjusted to Slice% | | | | 3,787 | 3,793 | | |
| 20 | Lower Bound Adjusted to Slice% | | | | 2,473 | 2,549 | | |
| 21 | << Slice Output >> | | | | | | | |
| 22 | | | | | MW - day | MWh | Err Code | |
| 23 | Begining Pondage Cumulative Balance -- draft = (-) / store =(+) | | | | | 0 | Must enter beginning pond balance value even if it is zero | |
| 24 | Recommended Pondage Balance Target -- draft =(-) / store =(+) | | | | (6) | (150) | | |
| 25 | Desired Pondage Use Target -- draft = (+) / store = (-) | | | | 125.9 | 3,020 | | |
| 26 | Recommended Slice Energy Take Target | | | | 3.1 | 75 | | |
| 27 | Target Tolerance (Up to 40% of Daily Range) | | | | 230.7 | 5,537 | | |
| 28 | Slice Share Daily Absolute Maximum (see comment) | | | | 56.6 | 1,359 | | |
| 29 | Slice Share Daily Absolute Minimum (see comment) | | | | | | | |
| 30 | Target Slice Share Daily | | | | 125.9 | 3,020 | | |
| 31 | Target Slice Share Daily Maximum | | | | 129.0 | 3,095 | | |
| 32 | Target Slice Share Daily Minimum | | | | 122.7 | 2,945 | 1 | |
| 33 | Slice 16-hr Sustained Max (Include full use of pondage) | | | | | 4,463 | | |

| | A | B | C | D | E | F | G | H |
|---|---|---|---|---|---|---|---|---|
| 31 | | Target Slice Share Daily Maximum —362 | | | 129.0 | 3,095 | 1 | |
| 32 | | Target Slice Share Daily Minimum —364 | | | 122.7 | 2,945 | | |
| 33 | | Slice 16-hr Sustained Max (Include full use of pondage) | | | | 4,463 | | |
| 34 | | Slice 8-hr Sustained Minimum —368 | | | | 543 | | |
| 35 | | HLH Total —370 | | | | 1,615 | | |
| 36 | | LLH Total —372 | | | | 1,075 | | |
| 37 | | Day Total | | | | | | |
| 38 | | Overall Error Check | #NAME? | | | Total Errors | | |
| 39 | | Capacity Violation | | | Upramp Violation | | | |
| 40 | | Minimum Generation Violation | | | Downramp Violation | | | |
| 41 | | BPA System Resource Comment | | | Real Time for Friday, January 2, 2004 | | | |
| 42 | | | | | | | | |
| 43 | | Benton County PUD - Pre-Schedule | | | Friday | | | January 2, 2004 |
| 44 | | Line ENERGY SCHEDULE | Type | PBL # | TBL # | HO1 | HO2 | HO3 |
| 45 | | OBLIGATIONS | | | | | | |
| 46 | | Load Forecast | | | 422122 | 162 | 162 | 166 |
| 47 | | Reserved for Block Market Macro | | | | | | - |
| 48 | | Reserved for Hourly Transaction Macro | | | | | | - |
| 49 | | Parked Hourly Transactions for R/T | | | | 6 | - | - |
| 50 | | Transactions (Reserved for Sales Below this Line) | | | | | | |
| 51 | | Altra Import Sales | | | | | | |
| 52 | | MSCGWSPP-LTBCPD/AVA@MDC|BEX|(PTP-SHNF) | | 0 | 622182 | 10 | 10 | 10 |
| 53 | | MSCGWSPP-LT-2BCPD/BCPD|BN| () | | 0 | 0 | - | - | - |
| 54 | | CPSWSPP-LTBPAP/FCPD|BN| (FCPD) | SL | 30515 | 0 | 20 | 20 | 20 |
| 55 | | | | | | | | |
| 56 | | | | | | | | |
| 57 | | JSE Recommended Sales | | | | | | |
| 58 | | | | | | | | |
| 59 | | | | | | | | |
| 60 | | | | | | | | |
| 61 | | Additional Day-Ahead Sales | | | | | | |
| 62 | | CPSWSPP-LTBCPD/PGE|BEX|(PTP-SHNF) | | 0 | 622182 | 5 | 5 | 5 |

| Buy/Sell Logic Compoent (+ = Sale, - = Buy) |
|---|
| 1. Compute lagest LLH block that can be brought in under min. gen'n, ramp and maintain max. load forecast error margin. |
| 2. Limit HLH block sale to surplus capacity adjusted for reserve & load forecast error margin |
| 3. Further limit HLH sale not to exceed 16-hr sustained max and largest Slice dailiy assuming max. LLH block purchases. |

— 420

| | | |
|---|---|---|
| HLH_Action | AF12 | 32 |
| LLH_Action | AF13 | -23 |
| HLH_Cushion | AF14 | 0 |
| Month_Txt | AF15 | 01 |
| Day_Txt | AF16 | 02 |
| RT_Target | AF17 | 11 |
| LLH_Room | AF18 | 23.0 |
| Max_HrMarket | AF19 | 12 |
| Sum_HLH_Use | E35 | 1,615 |
| HLH_Limit | E33 | 4,463 |
| Total_Errors | G38 | 2 |

— 610
— 612

Storage File Path
C:\Development\
Slice Data File Path
C:\Development\

| Max Dnramp=Max/Min(a,x/Request,-Hr min)-a,x(Request,-Hr min) -Downram, b x (request, -Hr min)), c) | | | |
|---|---|---|---|
| MW | Slope [a] | Constant [b] | No less than [c] |
| Up Ramp Max | 0.000 | 0.000 | 4,000 |
| Dn Ramp Max | 0.400 | 0.500 | 1,000 |

FIG. 22

SYSTEM AND METHOD FOR MANAGING AND OPTIMIZING POWER USE

RELATED APPLICATIONS

This application is a Converted Provisional into Non-provisional application from previously filed provisional U.S. Ser. No. 60/675,342, filed Apr. 26, 2005 and is a Continuation-in-Part of Ser. No. 10/152,088 filed May 20, 2002 now U.S. Pat. No. 7,089,190.

BACKGROUND a) Field of the Invention

The present concept relates to a system and method by which public utility districts, utility companies, and other power, natural gas and energy companies within the power industry can effectively acquire information to integrate, analyze, optimize, and utilize the respective energy supply, as well as position themselves within the market ahead of changing environmental conditions.

b) Background Art

This current embodiment was developed for the particular operating environment which exists in the area served by the Bonneville Power Administration (BPA) and other areas which have somewhat similar operations (e.g. the Western Area Power Administration [WAPA] that operates the Hoover Dam). Further, much of the text available that describes this system and method was prepared with specific reference to the area served by the Bonneville Power Administration. Accordingly, it is believed that a clearer understanding will be obtained by relating this present embodiment specifically to the operating system in this operating area of the BPA and for convenience of the description, terminology and references will be made to the BPA and the practices in that area.

Also, the assignee, which is responsible for the development and implementation of system and method has adopted descriptive terminology. For example, the overall system is referred to internally by this company as "PowerBiz" (the trademark rights of which are being claimed by the Assignee) and other terminology adopted by the assignee will appear throughout the text.

However, it is to be understood that this embodiment is simply done by way of illustration, and these terms are not being used in a generic sense. Rather, the description of the system and method are intended to apply more broadly to other situations in environments where similar or related conditions would be present, and the elements or components having such designations (e.g. "SLICE Optimizer") are to be interpreted more broadly.

Also, the term "BPA", is intended not to refer just to the Bonneville Power Administration, but also to other companies or entities in the power industries which have operations sufficiently related to the present embodiment so that it will be applicable to such entities. Also, the term "Power Companies" is to be used in a broad sense to apply to any of the companies or entities which are engaged in the generation, distribution, use, and/or transportation of power, and more particularly, to those which are dealing in electrical power.

A description of the general operating environment of such power companies will aide to lay the foundation for further discussion.

Generally power in the Northwest comes from a variety of sources and levels. The largest provider of power in the Northwest is the Columbia watershed system. Other power generation sources include natural gas, turbine engines, wind, and solar power. Because the Columbia watershed provides an abundant source of hydroelectric power, the cost to produce this power is much less than other power resources. Consequently, the administrative authority, Bonneville Power Administration, wields considerable influence over the local power market.

The Columbia watershed consists of a series of 42 dams along the main rivers and tributaries. Not all of the dams have power generation capacity. Further, those dams which do have power generation capacity do not run all at the same time. The Columbia watershed system was initially built for flood control, irrigation, navigation, recreation, fishing, and lastly hydroelectric power. All of the components of the Columbia watershed system represent varying levels of competing interest for use of the natural resource. These competing interests include: farming communities located in the surrounding region requiring flood control and irrigation. Further, cities along the Columbia River require a minimum flow for navigation of ships to transport goods and services. Minimum flow is also required for fisheries and recreational activities. These competing interests limit the Bonneville Power Authority's ability to maximize the hydroelectric power capacity of the Columbia watershed system. Consequently much of the storage capacity may go unused.

Within the geographic region served by the Bonneville Power Authority are a series of municipalities, counties, and public utility districts (PUD's) which are essentially areas comprising an aggregate group of power users. Each municipality, county, or public utility district may have varying load requirements based on its own unique demographic characteristics. For example, one PUD may be comprised of industrial type power users, while another PUD may be comprised of residential communities. Thus the power load required to service these users varies based on characteristics such as time and quantity of use.

The BPA distributes the power to the respective power users including PUD's. These power users generally in turn sell the power to the consumer such as businesses and residences. The power may also be traded on the open market.

To alleviate the high overhead of managing such a complex power distribution and accounting system, the BPA developed an "energy product" to sell to the various PUD's. The sale of energy product is based on a public entitlement system. This privatized entitlement system is referred to as the SLICE entitlement system. The energy product is itself is referred to as a SLICE contract. Each qualified PUD has the option of entering into a long term SLICE contract entitling the PUD to a certain percentage of the Hydro electric power output from the BPA over a given period of time. It should be noted that the SLICE resource is but one of many power resources that might comprise a PUD's energy sources.

But, the SLICE product itself is predominantly comprised of hydropower generation resources. Like other hydropower resources, it is unique in that the present use of the resource influences how much of the resource is available in the future. For example, once water is released from a reservoir to generate electricity, that water is not immediately replaced. Nature replaces the resource through precipitation and runoff. Therefore, effective planning and forecasting of the SLICE resource is essential to the pud's long-term profitability.

The SLICE product is delivered and managed in the form of electrical power. The amount of electrical power a SLICE participant receives is referred to as the SLICE entitlement. This entitlement is not a fixed number or KWH's or MWH's, but a fixed percentage of the actual output of the SLICE System Resources (as defined by the BPA), and therefore is dependent on water conditions that occur in any given year. Also, the amount of SLICE energy delivered to a participant is not guaranteed, nor is the timing of power deliveries likely to match a participant's actual requirements over the course of a year. The BPA SLICE product has several unique characteristics.

1) A small portion of SLICE is generated from thermal plants. This portion covers the base load requirements of the SLICE participant, and is included in the minimum generation limit.
2) SLICE is also comprised of multiple hydro resources, meaning that as water is released from one hydro plant to generate electricity, the released water flows downstream through other hydro plants and generates additional electricity. The result of this downstream effect is addressed in the overall management of SLICE.
3) The BPA has ultimate control over SLICE and the energy generating components. The participants do not contract for a right to operate or control the BPA system resources (including it's reservoirs and hydro plants) but only contract for a percentage of the hydroelectric output generated by the BPA.
4) The BPA thus establishes and maintains for each participant a SLICE System Storage Account (SSA) for monitoring each participant's use and determining if the participant t is staying within the boundary limits set by the BPA for energy storage and release. The SSA is in essence a paper reservoir or pond. This paper-reservoir is a contractual storage account for each SLICE participant, which may or may not correlate to a physical storage account. The SLICE Participant is obligated to maintain its paper reservoir within its prescribed upper and lower bounds, bounds which change from day-to-day. At the end of each day, the BPA makes an accounting of the SLICE Participant's use of it's SLICE resource, and notifies the SLICE Participant of it's storage capacity or whether or not the SLICE Participant has violated any upper or lower bounds. BPA has the right to levy severe penalties if these bounds are violated.

The participant may shape or configure its SLICE resource delivery so long as the rate of delivery of SLICE is between the maximum and minimum operating limits established by BPA. The participant's SLICE SSA (the paper reservoir) is used to track the accumulated difference between the SLICE power received and the participant's SLICE entitlement.

The advantage of SLICE to the participant is that they can control how this resource is used. A SLICE participant can decide to minimize the amount of SLICE energy delivered to increase the amount of storage in its paper-pond, and conversely, maximize the amount of SLICE energy and thus draw down the paper-reservoir. This flexibility allows a Participant to use the SLICE product and counter market price fluxuations. For example, if the market price is high, a SLICE customer can use SLICE energy in lieu of purchasing energy on the open market or they can generate excess energy and sell it. Likewise, if the market price of energy is low, a SLICE customer can reduce its use of SLICE energy and store the energy in its paper-reservoir until prices conceivably rise again.

The advantage to BPA is that they are relieved from the responsibility of meeting the customer's load. The customer has a greater degree of control of the power supply and the obligation to meet load. When the optimal use of SLICE results in deficits or surpluses, the SLICE participant must buy from or sell energy in the open market to maintain it's paper reservoir contractual SLICE obligations.

Beyond notification of the paper pond status, the BPA will not provide the SLICE users with additional real-time information. Thus, the burden of managing and forcasting load requirements versus power supply in the paper reservoir is placed squarely on the SLICE Participant.

The BPA has established a communication protocol to efficiently and effectively communicate SLICE status reports between the SLICE participant and the BPA. These status reports include maximum and minimum reservoir runs of the Columbia watershed. Also included are the BPA's load meter data for end user usage generally provided at the end of the operating day at hour 24. Because the load meter data is delayed information and is only delivered every 24 hours, the SLICE participants who buy and sell energy on the open market require real-time information monitoring the transmissions and communications of energy usage on a hour by hour basis. Thus they have developed their own proprietary load metering system. This proprietary load metering monitoring system is synchronized against the BPA end of day load meter information.

The SLICE information sent by the BPA also includes the SLICE boundary information in the form of an XML document. Each SLICE participant receives this information. After each SLICE participant has determined it's scheduled use of the SLICE resource, the protocol for communicating this schedule includes formating the schedule into an XML document for efficient portability back to the BPA system. How each SLICE participant performs this manipulation of max/min SLICE boundary conditions and generation of the schedule is unique to the individual SLICE participant.

Consequently, an unsophisticated SLICE participant might not schedule and utilize the SLICE resource efficiently thus finding itself in violation of an upper or lower paper reservoir boundary. If in violation the SLICE Participant will most likely be levied fines by the BPA. This system efficiently manages and utilizes the SLICE resource for these various SLICE participants, thus mitigating any management risks.

BRIEF DESCRIPTION OF THE DRAWINGS

FIG. 7 is s diagram of the pre-scheduler,

FIG. 8 is a diagram of the pre-scheduler detailing the pre-schedule input data,

FIG. 9 is an additional view of the diagram for the pre-scheduler,

FIG. 13 is a view of the pre-scheduler detailing the pre-scheduler data components, FIG. 14 is a view of the pre-scheduler detailing the existing purchases for a PUD, FIG. 15 is a view of the transaction detail energy purchases, FIG. 21 is a block diagram of the buy/sell logic component.

DESCRIPTION OF THE CURRENT EMBODIMENTS

Start text here As will be discussed in more detail later herein, the present system and method determines how to best utilize the SLICE resource for an individual SLICE Participant as well as for a group of SLICE Participants. This system is referred to as PowerBiz, and the company or other entity operating the system is generally termed a PowerBiz provider, or SLICE account manager. The one key component of PowerBiz is the SLICE Optimizer, which creates an optimal SLICE usage schedule.

As indicated previously, certain terminology used in this text is derived from terms that have been adopted by the Assignee of the present invention. Thus, as indicated above, the term "PowerBiz" refers to the entire system. The term "SLICE Optimizer" relates to the computer system and associated components and/or methods in operating the same.

System Architecture and Process Flow

It will first be beneficial to discuss the overall system architecture and detail the various system components feeding into and comprising the Power Biz program.

Figure 1:
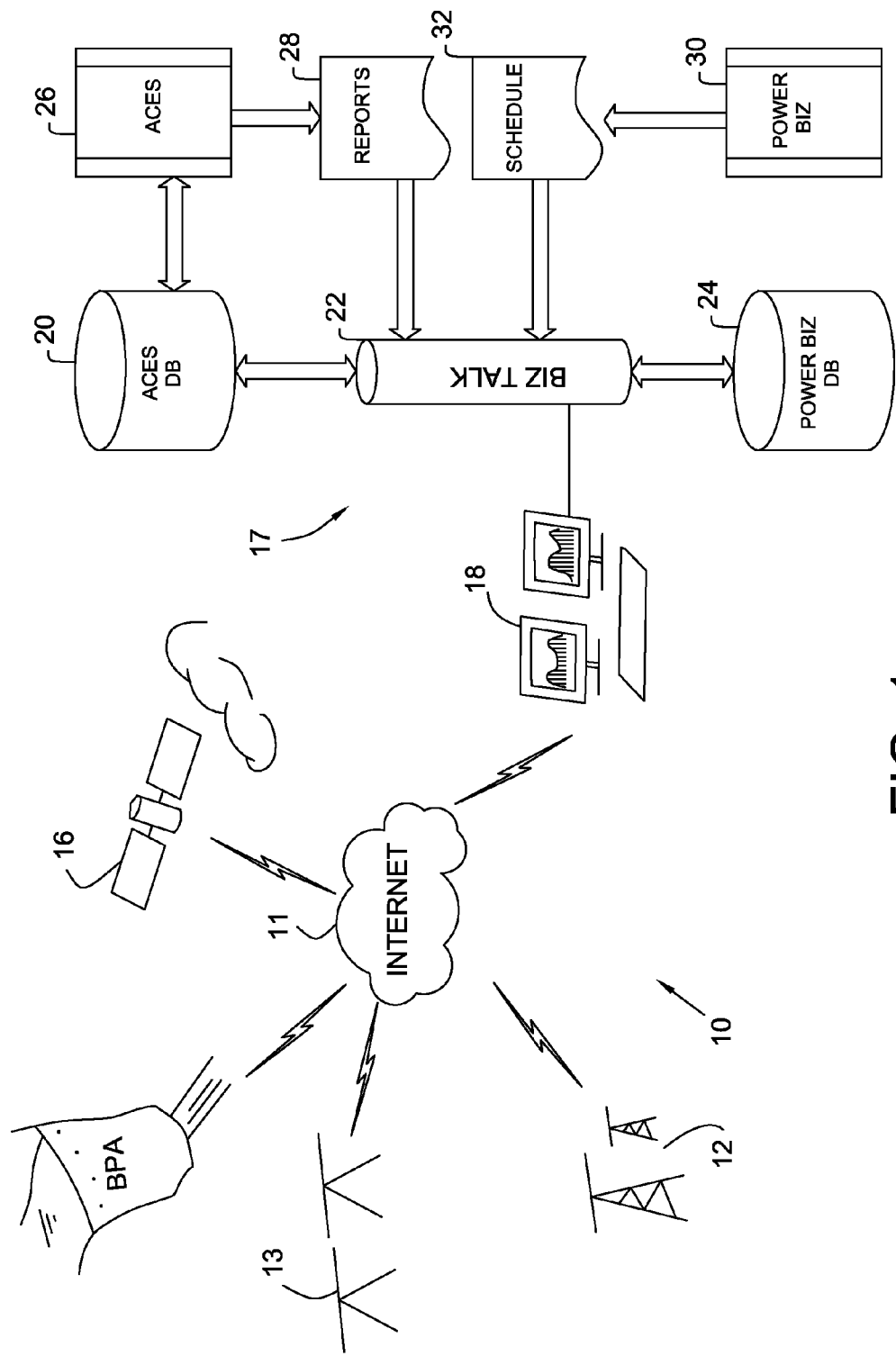
FIG. 1 is an overall block diagram of the information system.

Referring now to FIG. 1, information critical to effectively managing the SLICE reseource is gathered and processed from a variety of sources. These various sources of external data and information comprise an information system 10, where the external data is imported into the Power Business System 17, where the external data includes SCADA meter data 12 (the proprietary load meter data discussed above), BPA load meter data 13, BPA SLICE resource data 14, and weather satellite forcast data 16, among other information, which is all sent through various means connected to the Internet 11.

Information is gathered and distributed through the power business provider server 18, such as the FTP or web servers providing XML data feed, servers which take the external source data and transfers the information to a Microsoft BizTalk server 22 for formating and porting to a SQL server database. One such customized SQL Server database is the Power Biz database 24.

Also, historical power and weather data is drawn from the ACES database 20 along with other financial accounting information stored in the ACES database 20. The ACES database 20 is a separate application used for tracking and accounting long term contracts, energy use, and other client specific information.

Still refering to FIG. 1, after importing the various internal and external data into the Power Biz database 24 an instance of the Power Biz program 30 can be executed. This program 30 is used to produce an optimized SLICE resource schedule 32 for each individual SLICE participant. This schedule 32 is formatted and exported to the Bonneville Power Authority for the BPA's scheduling of energy resources the next few days in advance, day ahead or for real time. The schedule 32 is also saved in the Power Biz database 24 which in turn is also saved to the ACES database 24 for tracking and accounting purposes.

With the overall system architecture in place, we can now discuss in more detail the Power Biz System 50.

From a power management point of view, the Power Biz system can be divided in to two primary functions.

1) Pre-Schedule Optimization

2) Real-Time Schedule Optimization

Pre-schedule optimization is one of the most powerful aspects of the Power Biz application 50. The purpose of pre-scheduling is to identify the power needed to meet the forecasted load of the individual SLICE Participants. Also, a purpose is to identify any surplus power available for disposal on the open market. This pre-scheduling process also ensures sufficient transmission bandwidth exists to move the power from source point (such as the BPA generation facilities) to delivery point (such as PUD electrical stations). This pre-scheduling provides a strong data foundation for the buy and sell positions of the SLICE participant's energy resources a day ahead of actual load use. The forecasted load is prepared, based on a correlation of historical weather and energy use patterns. Adjustments for industrial and agricultural loads are also included in the forecasted load. Pre-scheduling is completed the day before the actual use schedule goes into effect.

The purpose of real-time scheduling is to adjust the use of power resources (such as SLICE) to account for changes between the forecasted load and the actual real-time load. Real-time schedule optimization provides information on how to adjust the use of SLICE resources when updated load forecasts based on actual load take, and market prices change during the day.

As stated before, SLICE is essentially a hydropower energy resource, and as such, how it is used today effects how it can be used tomorrow. For example, using the SLICE resource today to meet a load may mean the SLICE resource is not available tomorrow to meet a load. Conversely, if you use less today, there will be more available tomorrow. Because of the limited nature of the resource, much care must go into determining how best to use the SLICE resource.

Thus, the SLICE Optimizer provides the Power Biz user with the information necessary to schedule the SLICE resource to achieve optimal environmental, agricultural, and economic balance and meet the energy demand loads for a utility.

The Optimizer is one component of the PowerBiz application. Though the PowerBiz application has many functions, the primary purpose of PowerBiz is to support the optimization of the SLICE resources.

Figure 2:
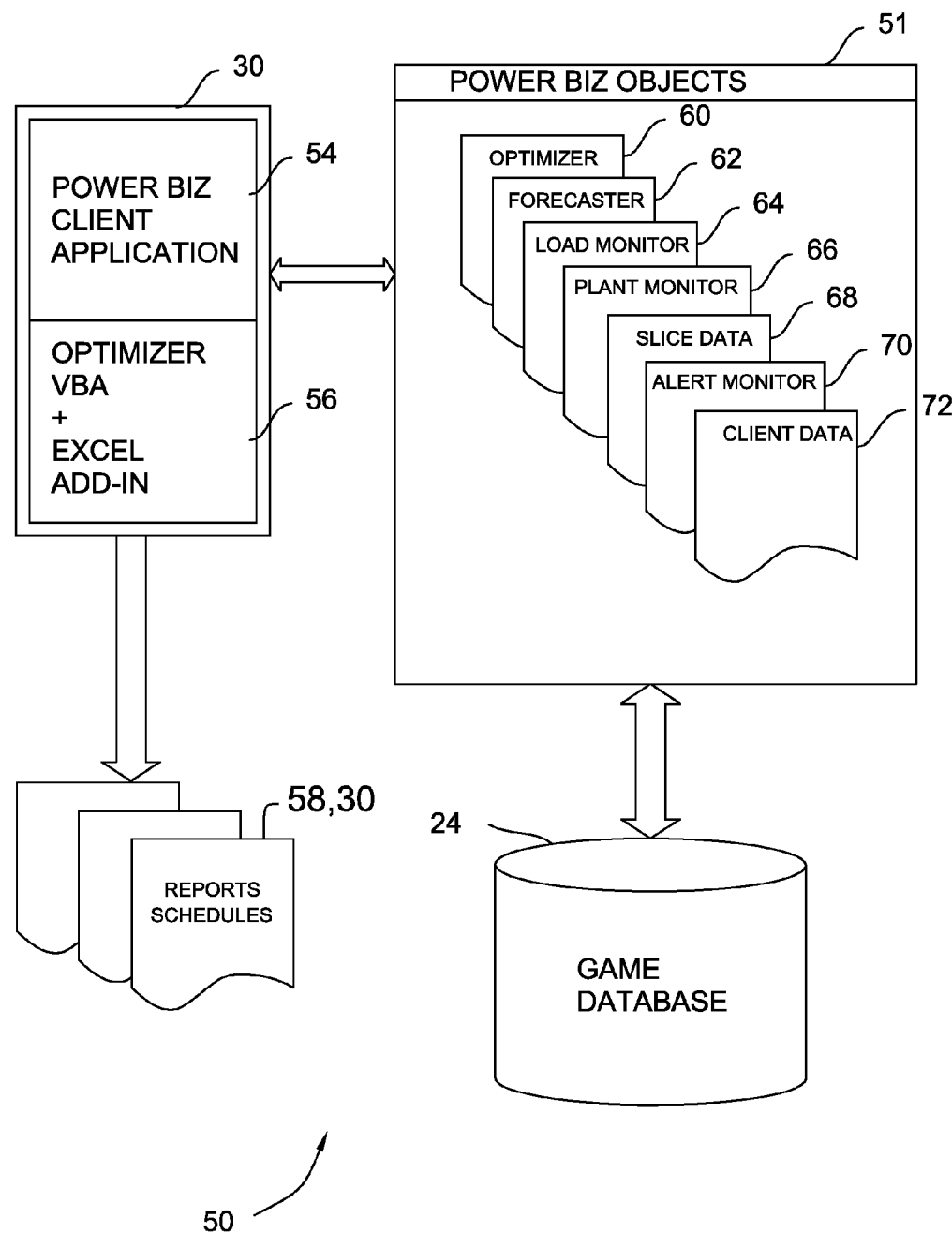
FIG. 2 is a block diagram of the PowerBiz application.

The Power Business system 50 as shown in FIG. 2 is comprised of the Power Business SQL Server database 24, the power business object library 51, the power business client application 54, the optimizer client application 56 which includes Visual Basic code and an interactive Excel spreadsheet as well as the output information such as reports and schedules 58. When starting the Power Biz client application 54, the application is initialized and various software objects are called to create a real-time power business client application 54. Various PowerBiz objects initialized include the optimizer object 60, the forecaster object 62, load monitor object 64, plant monitor object 66, SLICE data object 68, alert monitor object 70, and client data objects 72. Various data is pulled into the current instance of the PowerBiz application 54 depending on the current state of use. For example, during pre-scheduling activities PowerBiz collects client meter data 12 as shown in FIG. 1, weather forecast data 16, BPA meter data 13, BPA SLICE resource data 14, long term forecasts from the ACES Database 20, and other information used by the Load Forecaster 62 to generate day-ahead load forecast schedules 58 as shown in FIG. 2.

Briefly, the overall flow follows these general steps. The optimizer 56, determines the best schedule for balancing the load forecast with BPA, SLICE, and other resources.

Energy and transmission deals are made by the Power Biz users and these transactions are recorded in the ACES Database. Once the transactions are finalized and recorded, transaction records are pushed to the PowerBiz database to allow the user to create a schedule 58 for the intended use of the SLICE participant's SLICE resources to BPA.

Figure 3:
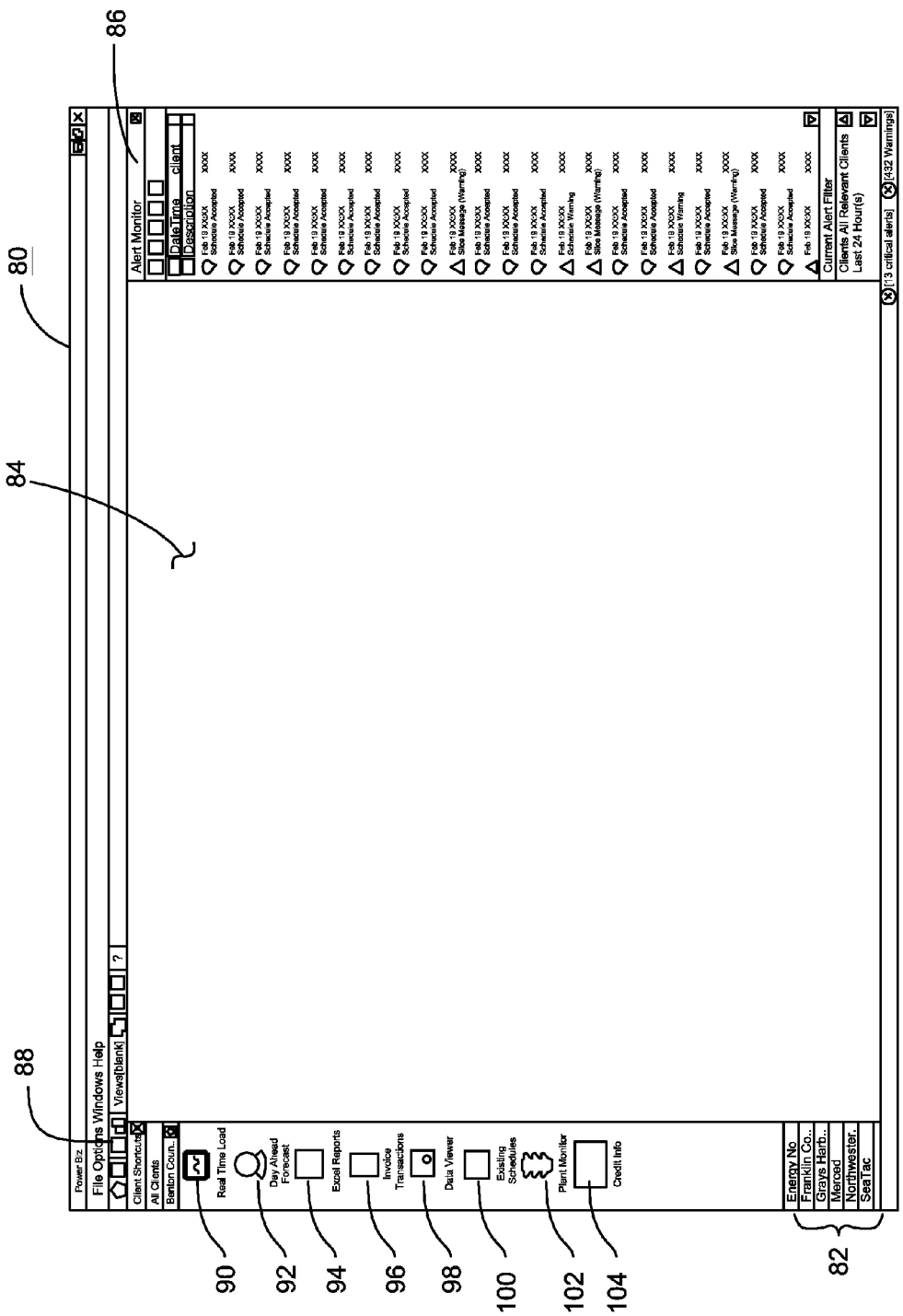
FIG. 3 is a diagram of the PowerBiz application.

A clear understanding of the power business application 54 can be seen in the following FIGS. 3 through 12. Referring to FIG. 3, the Power Business application desktop 80 shows a general operating environment 84. This desktop enables the power business user to view the real-time information being sent from the various data sources as shown in FIG. 1 such as the BPA SLICE data operating parameters 14, BPA sensor meter data 13, SCADA meter data 12, satellite weather data 16, long-term forecast information as taken from the ACES database 20, as well as other client information referring to existing transactions and existing transmission obligations.

The functionality of this desktop includes the ability to view the real-time load 90 of the SLICE participant. Additional functionality includes the day ahead forecast 92, clients excel reports 94, invoicing transaction reports 96, data viewer 98, existing schedules 100, plant monitor 102, credit information 104, listing of clients 82, alert monitor 86, and the optimization process button 88.

Figure 4:
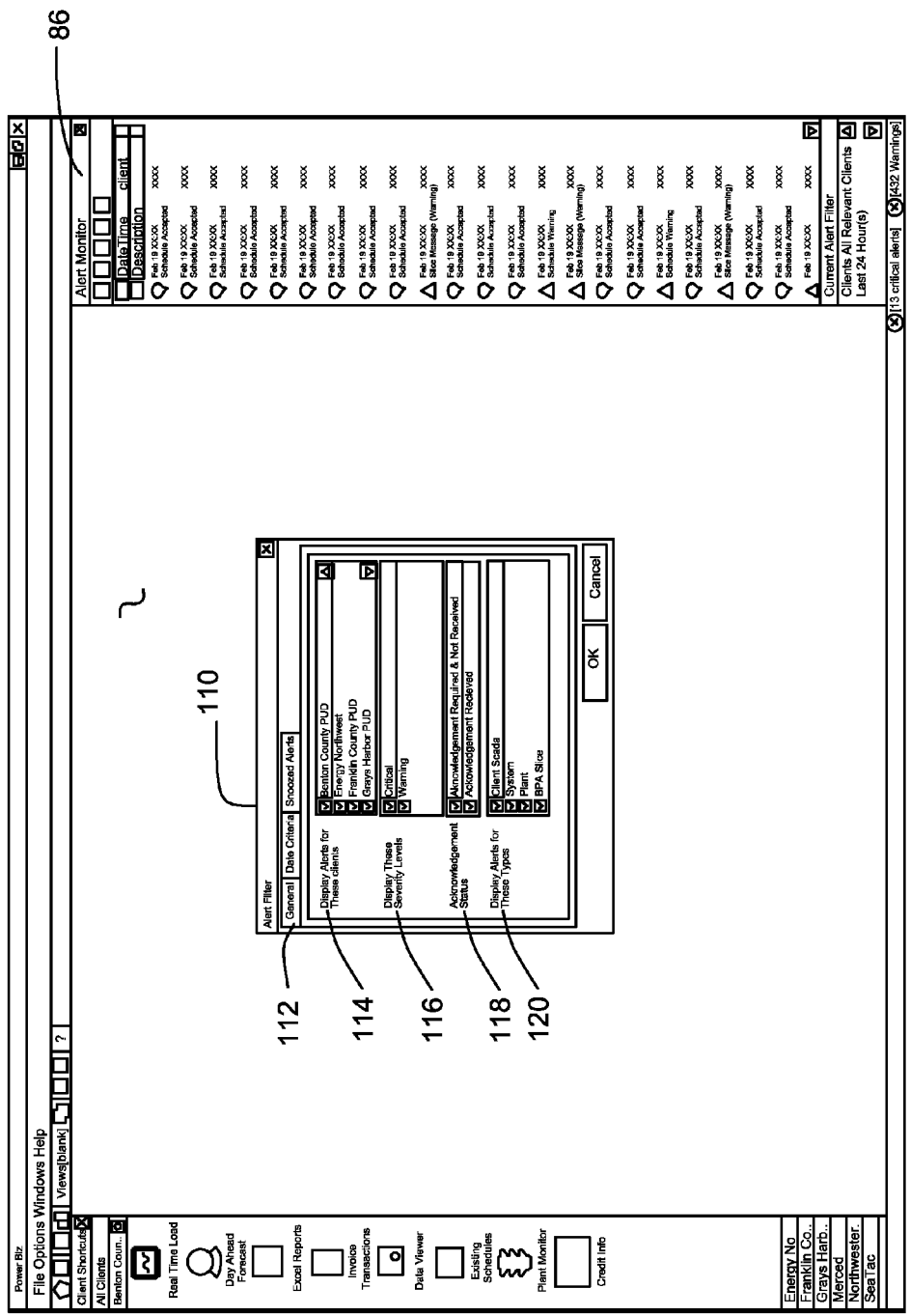
FIG. 4 his a diagram of the PowerBiz application showing an alert filter.

When running the power business application 54, the alert monitor 86 provides status report information with regard to SLICE resource data, as well as submitted SLICE schedules to the BPA. As shown in FIG. 4, the alert monitor 86 can be customized using alert filter 110. The upper row of tabs 112 on the alert filter 110 include general settings, date criteria, and snooze alerts. The client list 114 enables the power business user to choose which SLICE participants should be shown in the alert monitor display 86. The Power Biz user can also choose severity levels 116 such as critical alerts or warning alerts. When sending a schedule to the BPA, the power business user can monitor if the BPA has acknowledged receipt of the schedule under the acknowledgment status alert 118. Alerts can be shown for various alert types 120 such as client SCADA data, system data, plant data, and BPA SLICE data.

Still referring to FIG. 3, one of the main components of the power business application is the day head forecast object 92. The forecaster 92 enables the power business user to estimate the expected load for the SLICE participants.

Generally each SLICE participant is a public utility district or PUD. Each public utility district has within it a plurality of points of delivery or POD's which themselves are essentially geographic regions wherein various load requirements originate. For example, the Benton County PUD comprises nine POD's which each have their own individual load requirements.

Figure 5:
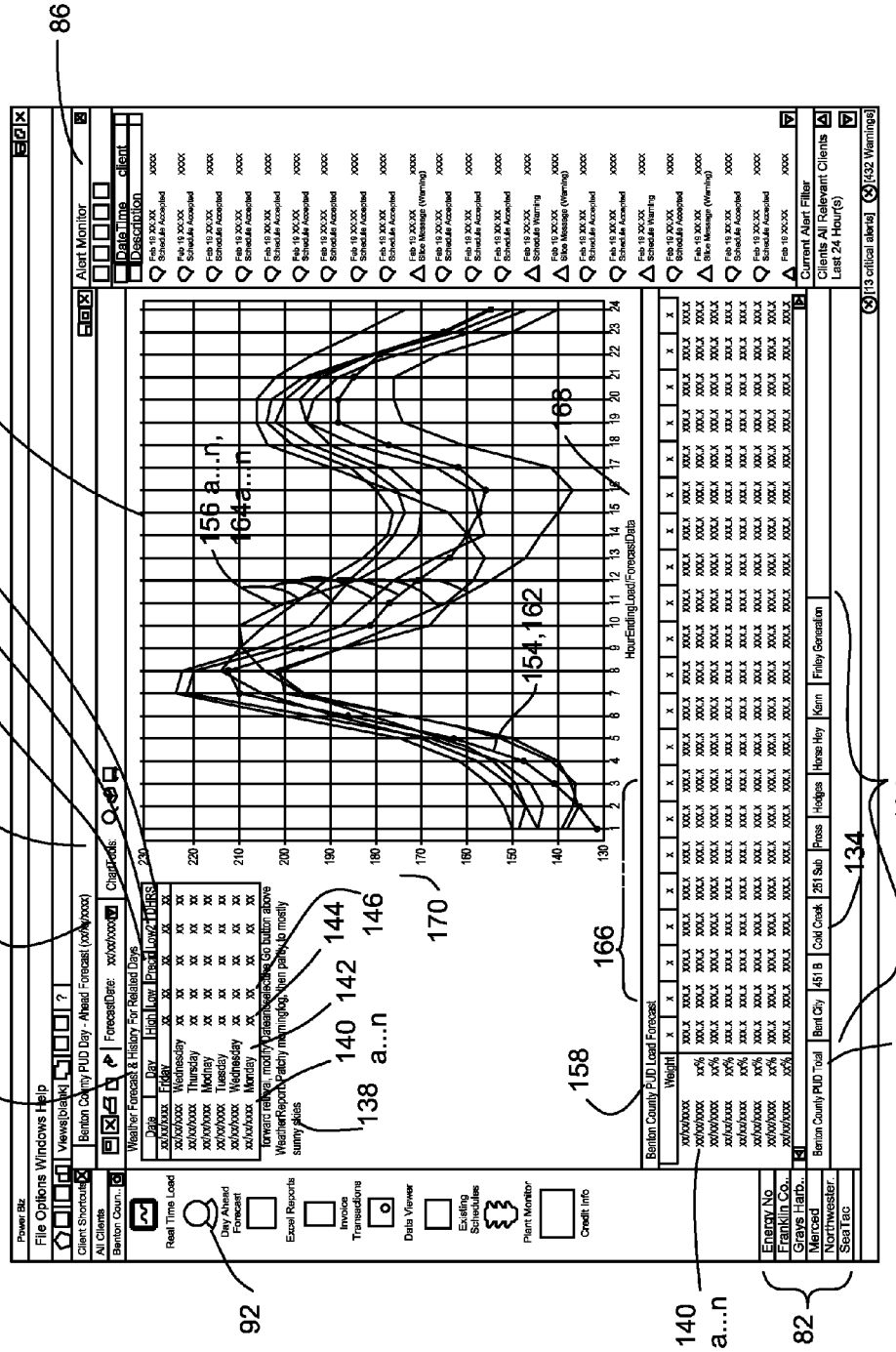
FIG. 5 is a diagram of the PowerBiz application showing the load forecaster.

When estimating the likely load for a given week, the power business user will choose a series of days which have the similar weather and load characteristics as the candidate day 132 as shown in FIG. 5.

The load forecast object 92 as shown in FIG. 5 displays a weather forecasting history for related days 136 field as well as the weather report 138 for the current candidate day 132. This weather report 138 is the information derived from the satellite weather service 16 or other weather information providers, as shown on FIG. 1. The power business user will use his experience in the field to choose a series of weather related days 140$a$ . . . $n$, days which historically are likely to correlate to the expected weather forecast report 138. The related days 140 are drawn from historical information kept in the ACES database 20 as shown in FIG. 1. This data is imported into the power business database 24 as shown in FIGS. 1 and 2. The power business user chooses days which correspond to the similar day of the week 142, days that have similar highs 144, lows 146 and correlating precipitation 148. Associated with these weather forecast days are load forecasts 158. For each related day 140 as shown in load forecast 158 is a recorded load for the SLICE participants geographic region for that particular day. For each day there is a particular load period 160 which corresponds to the 24 hours in a single day. The load forecast user chooses related days in close proximity to the current date. The reasoning is that load requirements change over time and what may have been a strong load requirement 10 years ago is now considered an average load requirement. Consequently, the forecaster will choose related days which are generally within a three-year range of the current date.

FIG. 5 also shows at the bottom of the screen a series of SLICE participant POD tabs 134$a$-$n$. The SLICE participant total 130 is a consolidation and aggregation of the various load requirements for the individual POD's 134$a$-$n$.

Also shown in FIG. 5 is a load forecast chart 166. This chart shows on its x-axis the hour ending load 168 and charts on its Y axis the megawatts per hour 170 of load use required.

Within this chart 166 are a series of aggregate PUD candidate day curves 156$a$-$n$ as well as an aggregate PUD load estimate 154. This aggregate curve 154 is derived from a form of the aggregate of the load curves 156$a$-$n$ as shown in the individual POD's 134$a$-$n$. For example, taking into consideration and individual POD 134$c$ Cold Creek, this POD will have its own historical load data 160 as well as historical weather forecast in history for related days 136. The related days load data will be charted on the individual POD's load chart 166. The scheduler will then chart an individual POD load estimate 162 based on what he thinks is the most likely load curve for that's individual POD on this specific candidate day 132.

The weighted average sum total of the individual POD's 134 is taken and displayed in both the PUD Total chart 167, as well as the sum of the historical load data 160. The Power Biz user can then make final adjustments to the aggregate PUD load estimate curve 154, and then the load forecast data for the day ahead is ready to be used in the Optimization process as discussed below.

Figure 6:
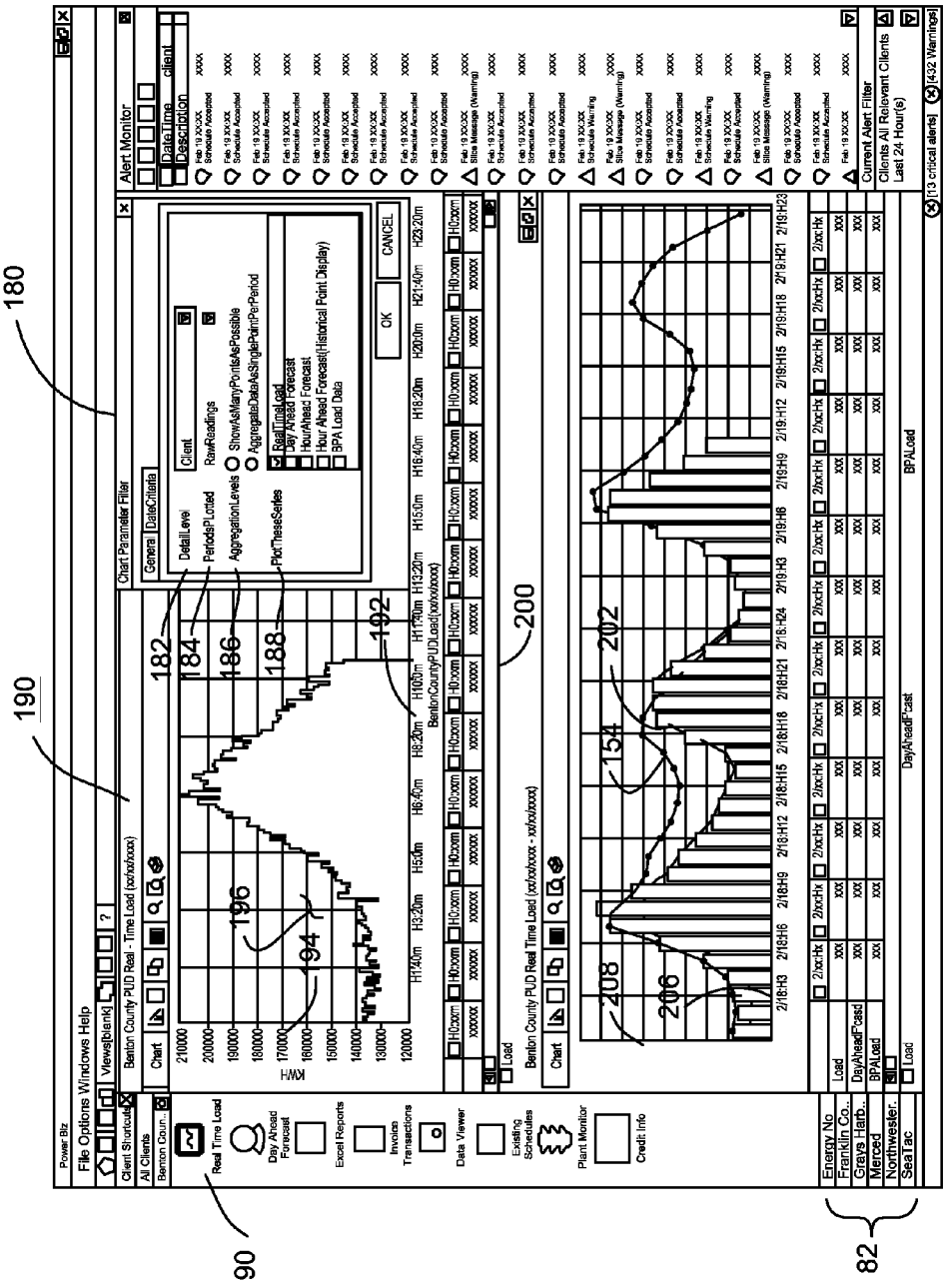
FIG. 6 is a diagram of the PowerBiz application showing the load monitor.

Also included in the power business application 54 as shown on FIG. 2 is the real-time load monitor 90 as shown on FIG. 6. A brief discussion of this real-time load monitor 90 and some of its operating parameters will now be provided.

When choosing the level of detail needed for display of the real-time load, the power business user can initialize a chart parameter filter 180. This chart parameter filter 180 enables the Power Biz user to display charts for SLICE participants listed in the SLICE participant list 82. The Power Biz user can choose the detail level 182, which in this example is shown as individual client, then the power biz user can choose the period plotted 184, where in this example raw readings are shown. The aggregation level 186 enables the power biz user to specify the level of granularity shown within a chart, such as chart for Benton County pud real-time load 190. Also the power biz user can choose to plot various data ranges 188 such as real-time load, day ahead forecaster, hour ahead forecast, hour ahead forecast historical point display, and BPA load data.

Two examples are shown in FIG. 6 for various chart parameters. Benton County pud real-time load 190 shows the real-time load 196 plotted against an hour and minute x-axis 192, as well as the Kilowatt hour Y axis 194. The second chart for Benton County pud real-time load 200 has a different level of plotting granularity with a load in hours x-axis 206 and Megawatt hours Y axis 208. Further, other series 188 are shown in this chart including the aggregate PUD load forecast 154 as previously discussed in FIG. 5 as well as the real-time load 202. The user can track the efficiency and accuracy of the forecasted load versus the real-time usage.

PowerBiz is designed to provide a plan for how to use the SLICE resource to achieve optimal economic results and at the same time meet a specific SLICE Participant's load requirements. As stated before, SLICE is only one of many resources that makes up the resource portfolio for the participant. Some of the resources may be available in fixed energy blocks. Blocks are uniform amounts of energy traded on the open energy market. The energy market is similar to the commodities market, and the energy blocks traded can be analogized to commodities such as oranges traded on the oranges commodities market. With weather conditions affecting crop production, and thus avalibility of oranges on the market, buying and selling of purchasing rights to the commodity occurs. Similar buying and selling of energy blocks occurs based on demand and real time conditions.

Most resources have a unit price associated with it. The SLICE resource is unique in that it has total price, but the unit price is influenced by how much of the SLICE resource is available and is used. How much gets used is dependent upon the SLICE participant, but how much is available is dependent upon how and when the hydro-electric watershed is replenished by precipitation and runoff.

The optimizer performs three separate operations to generate an optimized schedule:

Storage Optimization—Determines the amount of SLICE resources to use in order to achieve a targeted storage volume (storage target) or maintain the current reserve (flow target).

Joint Scheduling Optimization—Identifies transactions that balance energy needs across SLICE Participants being managed by the PowerBiz provider. This allows a client with an energy need to obtain that energy from another SLICE participant/PowerBiz client; provided the energy is returned so that future paper-reservoir boundaries are not violated. Generally, the energy is returned once the borrowing entity has surplus energy available during pre-scheduling.

Energy Optimization—If a client of the PowerBiz provider has surplus energy to sell, this optimization produces a schedule that maximizes or minimizes the potential revenue from the surplus energy. Maximizing the potential revenue results in an associated increase in real-time scheduling (increased risk).

The SLICE optimizer 56 is initialized from the power business application 54. The optimizer 56 draws the data from the power business application 54, and runs the optimization process (as discussed further below) which then returns information to the power business application 54. To perform the optimization process the optimizer 56 needs the day ahead forecast 62, the BPA SLICE system operating constraints 14, information such as power transmissions and transactions which is essentially client data 72 as shown in FIG. 2, as well as information provided by the power business user such as market price of power, expected precipitation and runoff, long-term market projections, and SLICE resource use aggressiveness factors. These operating parameters are generally referred to as optimization strategy variables.

The Optimizer 56 takes this information, and calculates an optimal energy purchase or sale schedule. The Power Biz user can generate multiple scenarios to evaluate how short or long-term targets can be achieved. The optimizer 56 also maintains operation of the SLICE resource within predefined operating limits so that no operating penalties for exceeding minimum or maximum operating limits imposed by the BPA occur.

Refering to FIG. 2, during the pre-scheduling overall process, generally the pre-scheduler operator will initialize PowerBiz 54 and initialize the optimizer 56. After the optimizer 56 makes an initial SLICE optimization calculation, it will provide a suggested SLICE resource amount for the open market. This amount is provided for each hour in the 24 hour period. The Slice amount schedule is compared to the existing commited transactions of each SLICE participant. If a match between the optimized schedule and existing transactions exists, the optimization process is complete. The output of the optimization process is used to complete the scheduling of SLICE with BPA. This output is generally in the form of the schedules and reports 58.

If the optimized schedule and the existing transactions do not match, the Power Biz user, generally the pre-schedule operator, either buys or sells power and transmission on the open market, or between SLICE Participants, and then re-runs the optimizer after first entering in the new transactions. The cycle continues until the transactions match the optimized schedule. Once the balance is achieved, the output of the optimizer 56 is used to complete the scheduling of SLICE with BPA. This process is completed for each SLICE participant.

The Optimizer can also pool the surplus SLICE resources into one or more power blocks for sale on the open market. By doing so, the Power Biz user can sell larger, single blocks on the market for its clients. Consequently, the Power Biz user can manage the equitable distribution of such transactions to ensure its clients are credited for their various energy contributions.

Discussing in more detail the iterative process from which the pre-schedule operator determines the optimal SLICE schedule 58, the power biz user will launch the optimizer 56 and create a schedule for an individual SLICE participant.

The optimizer is essentially made of two forms of data architecture. These forms include an Excel spreadsheet 1000 as shown on FIG. 10, which has within it formulas for tracking and calculating prices, quantities, and resources. The other form is the Visual Basic code which performs the iterative logic analysis for determining an optimal SLICE schedule.

Figure 10:
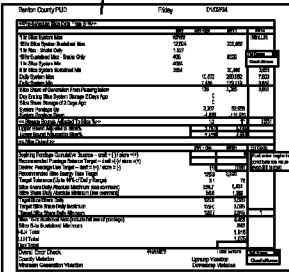
FIG. 10 is an overall view of the pre-scheduler for a specific PUD.

The first form of data architecture for the optimizer is the Excel spreadsheet 1000 and shown on FIG. 10. This Excel spreadsheet is composed of a number of different data range components which include pre-schedule data input component 300, pre-schedule scheduling procedure component 400, buy/sell logic component 420, and the pre-schedule energy schedule 440.

In general the optimizer user will launch the optimizer 56 from the power business application 80 as shown on FIG. 3. Refering to FIG. 10, the optimizer user then verifys all data has been entered correctly for the prescheduled data input component 300. The optimizer user then may choose to optimize the SLICE resources based on the optimizer's suggested heavy load hour (HLH) positions or light load hour (LLH) positions by following the prescheduling procedure component 400. Heavy load hours represent the peak hours of usage by the end-users. Light load hours represent the off-peak usage hours. Generally the light load hours are starting at 11:00 p.m. and ending after 6:00 AM. The heavy load hours are generally starting at 7:00 AM and ending after 10:00 PM.

A subprocess of this pre-scheduling procedure component 400 is the buy/sell logic component 420. Refering to FIG. 11, the optimizer user will take the suggested HLH action 410 and LLH actions 411 produced by the interim optimization results in the buy/sell logic component 420 and balance out the prescheduled energy schedule component 440 based on revised schedule publications, resources, balances and transmissions, capacity checks and other loads and resources which affect the day ahead use of the SLICE resource. Once the prescheduled energy schedule component 440 is completely balanced out or optimized, the final suggested HLH position and LLH positions in the prescheduled procedure component 400 are provided to the optimizer user for use in the day ahead schedule.

A more detailed discussion of the prescheduled input component 300 will now be provided. The first step in the SLICE optimization process is to identify and enter the pre-schedule SLICE data from various sources such as the BPA, SLICE participant's obligations and resources as well as other system constraints. Much of the information is brought into the optimizer directly from the power biz database. Refering to FIGS. 8 and 9, the pre-schedule input fields for the spreadsheet 300 is shown, the range is broken into three main areas including pre-schedule SLICE data from BPA 320, storage balance adjusted to SLICE 322 and SLICE output 324 FIG. 8.

In general the pre-schedule SLICE data from BPA 320 information is automatically imported into the spreadsheet from the power biz database 24. Also, the storage balances adjusted to SLICE 322 are automatic calculations which depending upon data imported into the schedule spread sheet 300 by the BPA. Adjustments made to the SLICE participant's account by the pre-scheduler mainly occur in the SLICE output region 324.

Part of this adjustment is made by the pre-scheduler or the day ahead scheduler when choosing a recommended SLICE energy take target 310. This target 310 is a subjective target based upon the current SLICE energy market and the current market price for energy products. Further this target 310 reflects the internal use of the SLICE resource by the SLICE participant as well as the external market demand for SLICE resource by the non-SLICE participants. Essentially this is a risk management or market aggressiveness variable with regard to how much of the SLICE resource should be utilized on any given day. This number is then used by the di-urinal buy/sell position optimization procedure 408, FIG. 11, described below and then exported back into the SLICE output 324.

Other manually entered field's in the SLICE output range 324 include the desired pondage use target 312. This field shows drafting or storing of energy in megawatt hours or megawatt days of the SLICE resource into a general pondage (the pondage being the storage of water or energy behind the hydro-electro generation units upstream or down stream of the Grand Coulee Dam, the main hydro-generation facility on the Columbia watershed).

Figure 8:
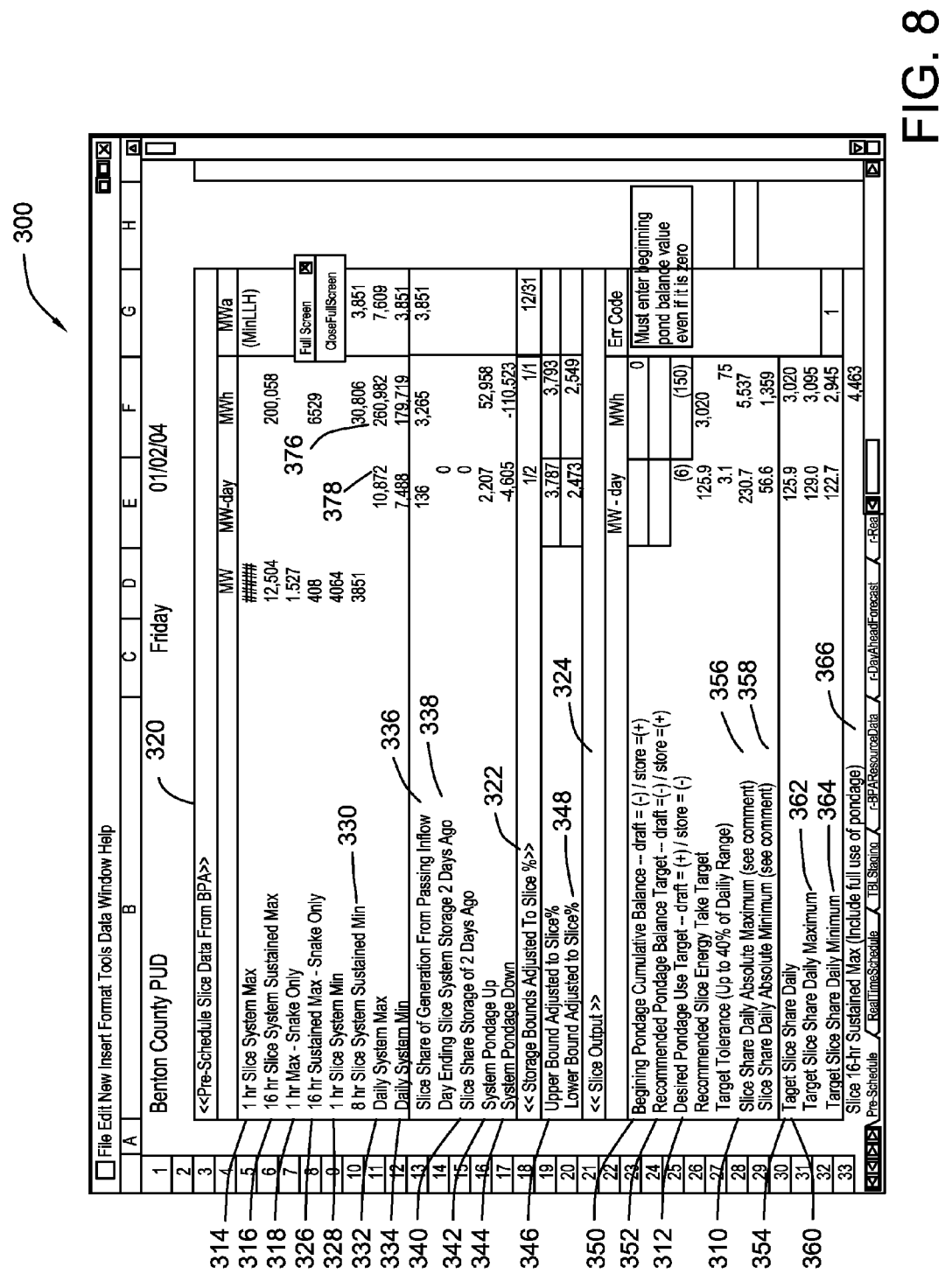

Still refering to FIG. 8, and describing in detail the fields in pre-schedule SLICE data from BPA 320:

The new one-hour SLICE system max 314 shows the maximum output in megawatts, megawatt days, or megawatt hours that the Columbia Federal watershed system can provide. This is a factored value based on the SLICE percentage of the SLICE participant.

The 16 hour SLICE system sustained Max 316 provides the maximum available energy in the heavy load hours which ranges from hour seven to hour 22. The one hour Max Snake Only 318 shows the maximum energy that the Snake River can sustain on an hourly basis. This energy is generated from the Snake River which is a tributary of the Columbia watershed. The snake River has a higher capacity to produce energy than the main stem of the Columbia River but has less storage availability and consequently the BPA provides a separate accounting of this energy for the SLICE participant.

The one-hour SLICE system minimum 328 shows the minimum output in megawatts, megawatt days, or megawatt hours that the Columbia Federal watershed system can provide on a percentage per SLICE participant basis.

The eight hour SLICE system sustained Min 330 provides the minimum available energy in the light load hours for the period of the day ranging from hour 22 to hour 7. Essentially this is the lower boundary of the SLICE system sustained minimum in which the BPA will provide energy to the SLICE participants.

The daily system Max 332 and the daily system Min 334 are the amounts the entire federal BPA system must produce to keep the energy flowing. These maximum and minimum energy amounts are directly related to the maximum amount of water which can flow from the Columbia system and the minimum amount of water which must flow to keep the Columbia system working.

The daily system Max 332 provides the amount of energy which the system can produce as a whole combining the 16 hour Max 318 and 326 with the 8 hour sustained minimum 330. For example, combining the 16 Hour Daily Max 316 and 326 with the 8 Hour SLICE System Sustained Min 330 gives a value of 260,928 in megawatt hours as shown in field 376 which is then divided by 24 hours to show a value of 10,872 megawatt days at field 378, this amount of energy in megawatt days is how the Daily System Max 332 is calculated.

The SLICE share of generation from passing inflow 336 is the amount of energy which comes into the Columbia watershed from the tributaries and other surrounding water sources feeding into the Columbia watershed. These water sources provide additional megawatts which are modeled in the SLICE system.

The day ending SLICE system storage two days ago 338 is provided by the BPA reflecting the SLICE storage amounts from the previous two days ago. Similarly, the SLICE share storage of two days ago 340 provides the SLICE participant with its individual SLICE storage share based on the day ending SLICE system storage to days ago 338.

The day ending SLICE system storage two days ago 338 and the SLICE share storage of two days ago 340 both are reflections upon the SLICE participants amount of SLICE resource available above and beyond their allocated amount. To give a clear example of how this can occur a SLICE participant may not allocate any use of the SLICE resource on a particular day. This information then is entered into a storage account and the BPA keeps track of how much SLICE resource has been stored and is available to the SLICE participant. Of course the SLICE participant cannot store all of its SLICE resource. The reason is because the participant may accrue so much SLICE storage in a paper accounting pond that it would be greater than the actual SLICE resources available. The SLICE resources are limited by the physical constraints of the individual dams and watersheds.

The system pondage up 342 and the system pondage down 344 describe resources within the Columbia watershed system which are minor energy generating storage structures. For example, there may be storage dams below the Grand Cooley which provide some additional energy generation capacity and for which the SLICE participant may draw energy from or store energy to. Since the majority of the SLICE resources come from Grand Cooley, the BPA requires that any SLICE resources taken from these downstream ponds be returned at a later date.

The system pondage up 342 is an accounting of how much SLICE resources the SLICE participant has to draw from these downstream storage facilities. This account is likened to an IRA account where one may have available cash storage to draw from but the amount must be returned or severe penalties will occur.

The system pondage down 344 is an accounting of the maximum amounts of SLICE storage capacity downstream of the Grand Cooley Dam which the SLICE participant can utilize. This is important because the daily system min 334 is the minimum required amount of SLICE resource which the SLICE participant must use. If the SLICE resource is not used, the resource will effectively be spilled over the reserviour and lost or the SLICE participant can choose to allocate this unused SLICE resource up to his system pondage downstream limit 344 for that particular day.

Comparing the system pondage down 344 to the SLICE share storage of both the day ending SLICE system storage 338 and the SLICE share storage of two days ago 340, the SLICE system storage provides the amount of storage capacity which the entire system has within it for SLICE resources. The pondage is a smaller amount of SLICE storage which essentially deals with the upstream and downstream storage facilities which do not have a large impact upon the storage capacity of the Columbia water shed system.

Still referring to FIG. 8, the upper bound adjusted to SLICE percentage 346 and the lower bound adjusted to SLICE percentage 348 are limits provided by the BPA which detail the upper boundary or maximum use of SLICE resource and the lower boundary or minimum use of the SLICE resource. The upper and lower boundaries for the SLICE resources are derived from information provided by the BPA. This information is in the form of head-feet of water which is stored at the Grand Cooley Dam. The Grand Cooley Dam has a flood control system which controls the head-feet of water behind the structure. As the water storage capacity increases so does the correlating megawatt per hour of SLICE resource which is stored behind the dam. The reservoir can only store so much physical water before it spills over. Similarly, the SLICE resource participants can only store so much SLICE resource in their paper storage reservoir before it spills over.

Consequently, the flood control system has an upper and lower operating parameter which translates into the upper bound and lower bound of the SLICE resource 346 and 348 in megawatt hours.

We will now describe beginning pondage cumulative balance 350, Recommended Pondage balance Target 352, and Desired Pondage Use Target 312, as shown on FIG. 8. It is important to get an accurate accounting of the storage of the SLICE resource on an hourly basis. To accomplish this the pre-scheduler needs to know what the amount of Mega Watt hours being stored or drafted out of the beginning cumulative balance pondage. Essentially this number provides pondage balance continuity from current day to day-ahead operations. Further, this number is important because in general the BPA does not provide total SLICE system storage information immediately for day ahead use. Consequently the power biz user will plan ahead on a month-to-month basis for the average use of the SLICE resource. This estimated schedule will enable the power biz user to enter in an average daily SLICE amount to be used for the particular day in question. This average daily SLICE amount is well within the upper and lower bounds 346 and 348 so as to not incur any SLICE resource loss or boundary penalties.

The SLICE share daily absolute maximum 356 and daily absolute minimum 358 provide the absolute maximum and minimum SLICE resources which can be drawn from the entire system. The entire system includes the main water storage facilities as well as the upstream and downstream pondage facilities. For example the SLICE share daily absolute maximum 356 is the Daily System Max 332 plus any system pondage up 342 to give an aggregate absolute daily maximum SLICE resource boundary. Similarly the SLICE share daily absolute minimum 358 is the sum of the Daily System Min 334 plus any system pondage down 344 or system pondage up 342 to provide an absolute daily minimum SLICE resource boundary. The target SLICE daily share 360 which correlates to the recommended SLICE energy take target 310 is a value which essentially is at a median point between the SLICE share daily absolute minimum 358 and the SLICE share daily absolute maximum 356. Knowledge of this median point enables the power biz user to adequately assure that the SLICE resource will not violate upper or lower bounds.

To set a maximum and minimum daily target SLICE the optimizer takes the target SLICE share daily 360 and adds the target tolerance cushion 354 to come up with a preliminary target SLICE share daily maximum 362 also the optimizer will look at the SLICE share daily absolute maximum 356 and choose the minimum value between the target SLICE share daily maximum 362 version one with the absolute daily maximum 356, this minimum value will be placed in the target SLICE share daily maximum field 362. Similarly the target SLICE share daily minimum 364 is the lower bound of the target SLICE share daily range for real-time operations.

The target tolerance 354 is based on a combination of the upper and lower boundary SLICE adjustments 346 and 348, the system pondage up 342 and the recommended pondage balance targets 352. This formula chooses a minimum value of the associated values above and applies a factor along with the percentage of SLICE entitlements to provide a megawatt per hour value which will cushion the target SLICE daily share value 360. Essentially what this target tolerance 354 does is sets the upper and lower boundaries upon which the real-time energy traders can dip into the pondage reserves such as the system pondage up 342 and the system pondage down 344.

The 16 hour sustained max 366 is the SLICE participants share of the 16 hour SLICE system sustained max 316 plus pondage flexibility such as the system pondage up 342 or the beginning pondage cumulative balance 350. This provides the maximum total amount of SLICE resource which should be used during the entire 16 hour heavy load hour operating period based on the BPA's information. This is an upper boundary for SLICE resource use on a per day basis over the 16 hour heavy load hour period.

Similarly the SLICE 8 hour sustained minimum 368 is the SLICE participants share of the 8 hour SLICE system sustained minimum 330 provided by BPA times the SLICE entitlement factor as a percentage. This value provides the lower boundary for the eight hour light load hour operating period on a per day basis.

SLICE optimization procedure:

The second process of the optimization procedure is the procedural logic based in the Visual Basic code and some of the user interfaces which are based in the Excel spreadsheet 1000.

Figure 11:
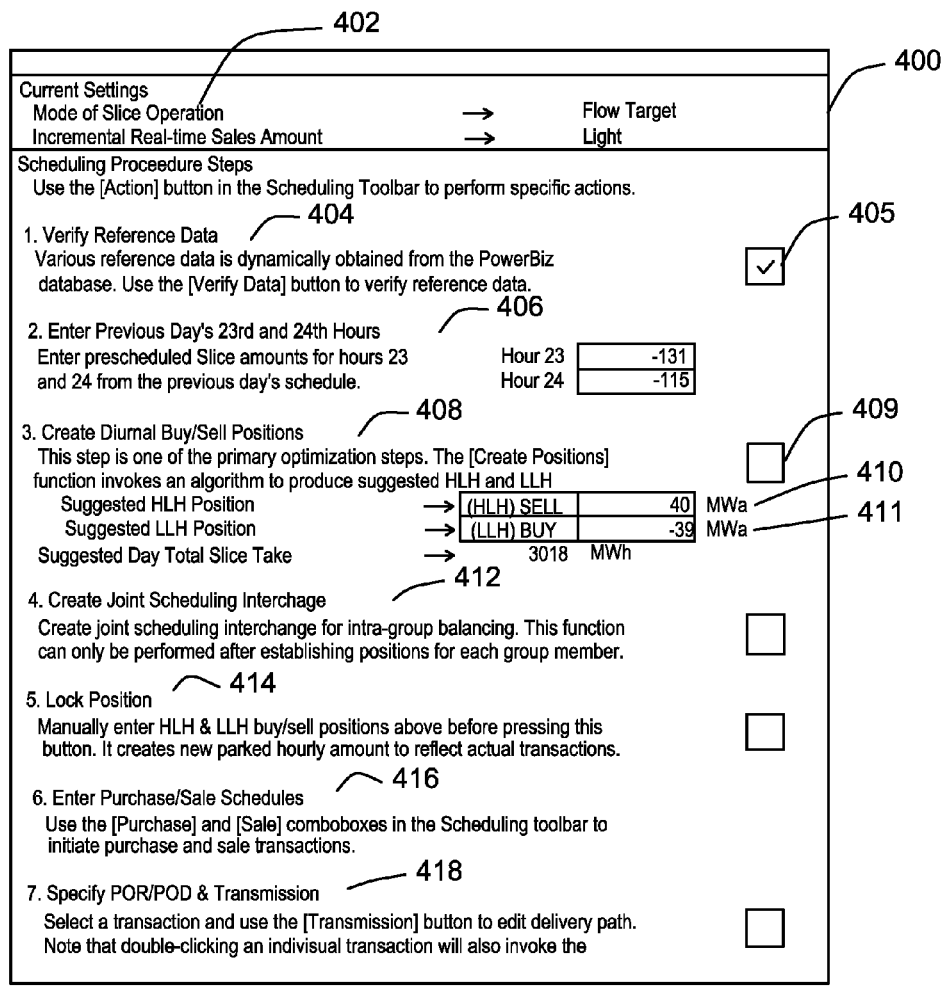
FIG. 11 is a view of the pre-scheduler scheduling procedures for the optimization process.

The precursor to running the Visual Basic code and obtaining an optimized schedule is to enter the user defined variables outlined in the prescheduled scheduling procedures 400 as shown in FIG. 11.

The prescheduled scheduling procedures 400 give a summary report of the procedures used to optimize the SLICE resource prior to the real-time transaction. This prescheduled scheduling procedure 400 has a number of user inputs, display fields, and scheduling procedure steps which guide the preschedule optimize user through the optimization process. The first step in the scheduling procedure is to choose the current settings 402 for the mode of the SLICE operation in the incremental real-time sales amount. When the SLICE operation mode is in flow target, the optimizer will optimize the SLICE resource as if the Columbia watershed system is flowing water in the real-time mode. This is a less aggressive mode of operation and enables the prescheduler to schedule most of the SLICE resources ahead of schedule. When the mode of SLICE operation is in the fixed mode, the operation aggressiveness is higher and puts more emphasis on the real-time traders to buy and sell the SLICE resources and make profit. The risk is that the market will not bear the fixed amount of SLICE resources to be sold. Further the level of aggressiveness indicates how much of the SLICE resource will be sold during the peak heavy load hours versus the nonpeak light load hours. By selling SLICE resources during the heavy load hours the powerbroker can maximize its clients and SLICE resource energy value.

With the aggressiveness settings in place the remainder of the rescheduling procedures can occur.

Figure 12:
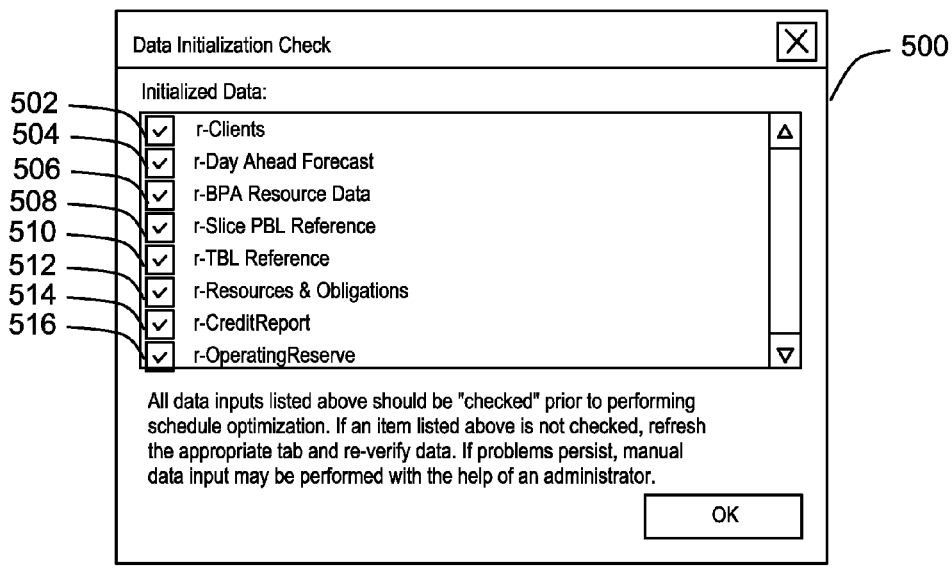
FIG. 12 is a view of the data initialization check for the optimization process.

The next step is to verify the reference data 404. this reference data is dynamically obtained from the power business application. By using the verify data button 405 the optimize user can access a data initialization check box 500 as shown in FIG. 12. This data initialization check box controls the initialization of the reference data which is dynamically ported in from the power business application. This information includes client information 502, day ahead forecast 504, BPA SLICE resource data 506, SLICE PBL reference data 508, TBL reference data 510, resources and obligations 512, credit report 514, and operating reserve 516.

Referring to FIG. 12 data initialization check box 500, the initialized data check box client 502 refers to information regarding the SLICE resource client and how much SLICE resource the client is allocated. Further it includes client name and abbreviation as well as percentage of SLICE resources.

Day ahead forecast 504 check box deals with the forecast and load data acquired and determined while running the Power Biz Application as shown in FIG. 5. The BPA resource data check box 506 refers to the Bonneville power authority maximum and minimum available SLICE resources for that particular client during a particular time. The SLICE PBL reference data 508 deals specifically with the power transaction information and the parties privy to the transaction. For example if a client buys or sells portions of the SLICE resource with a third-party power distributor on the open market then the power distributor has a particular reference ID number so as to track the purchase and sale of the power between the interested parties. The PBL reference data includes such tracking information.

The TBL reference data 510 refers to the unique identifier for the transmission of the power resource once it has been purchased or sold. These two items PBL reference data 508 and TBL reference data 510 provide two parts of the E-TAG purchase and sale document or transaction contract. This E-TAG document is referred to in FIG. 5000. Suffice it to say that the E-TAG document acts as a bill of lading for the transmission and purchase of the power resource and will not be referred to in further detail.

Resources and obligations 512 refer to the long-term buy and sell positions that the specific client has taken days or months ahead prior to the actual day of transaction. Credit report check box 514 refers to the SLICE client's credit information with the power broker.

The operating reserve 516 deals with the transmission side in lieu of the power purchasing side, because based on where the energy is being transmitted to or from, there is a reserve which needs to be included in the transaction amount to buffer for any loss due to transmission over power lines. This amount is a uniform loss per transmission length.

The associated information pulled in with to the optimizer is recorded in separate Excel spreadsheets located and reference to buy their tab sheets which correspond to the initialized data elements in the data initialization check 500.

Figure 13:
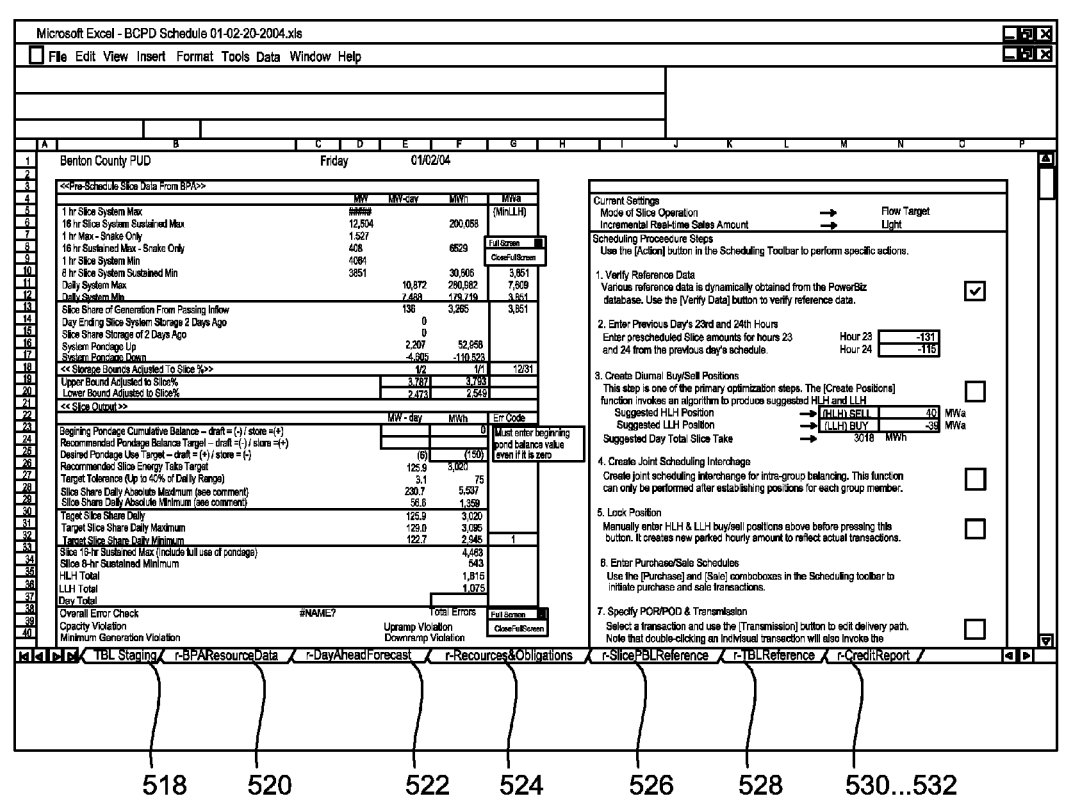

Referring briefly to FIG. 13 a portion of the optimizer spread sheet 1000 is shown. The actual data associated with the data initialization check box 500 is stored in Excel Sheet's whose tabs correlate with the check box names in the data initialization check box 500. They include BPA resource data tab 520, day ahead forecast tab 522, resources and obligations tab 524, clients 532, SLICE PBL Reference 526, TBL reference 528, credit report 530, and operating reserve within 524.

After the initialization of reference data 404 has taken place, the next step in the pre-scheduling scheduling process 400 is to perform the entering previous day's 23rd and 24th hours 406. Because the energy is being generated constantly, there needs to be continuity between the different data periods. To accomplish this continuity, the optimizer will factor in the previous day's 23rd and 24th hours. This is so that the data information is not starting from a zero level and ramping up immediately to its current state. For example to determine the ramp rate of a particular set of generators which may need to be operated during the current day ahead, the existing pre-scheduled SLICE amounts for hours 23 and 24 will need to be known and accessible in the system so that continuity is provided and a false violation does not occur.

Once this initial data has been entered including the reference data 404 and the previous day's 23rd and 24th hours 406, the optimizer is ready to be run. The main goal of the optimization process is to create a suggested heavy load hour position as well as suggested light load hour position. With these estimated sales positions the power manager can maximize his clients SLICE resource utilization.

Further referring to FIG. 11, prescheduled scheduling procedure, step 3 create diurnal buy/sell position 408 begins the core of the optimization process and shows the outputs of the suggested daily total SLICE take for the particular client's resources. Step 3 create diurnal buy/sell positions 408 has two output fields, suggested HLH position 410 and suggested LLH position 411. If the value in the output field is positive this means that the optimizer is giving a sell recommendation. If the optimizer outputs a negative value for either the LLH or HLH positions the recommendation is too purchase additional resources.

The optimizer provides the LLH and HLH positions and the pre-scheduler uses these values as a baseline for the day ahead aggregate light load hour estimates and aggregate heavy load hour estimate. Discussing further FIG. 11, step 4 create joint scheduling interchange 412, is a step which is not currently utilized in the pre-scheduling process.

Step 5 lock position 414 enables the pre-scheduler to manually enter and park buy/sell positions in the HLH and LLH field's above. This is done when actual transactions have already taken place and the scheduler knows that the entire SLICE resource has been utilized.

Figure 14:
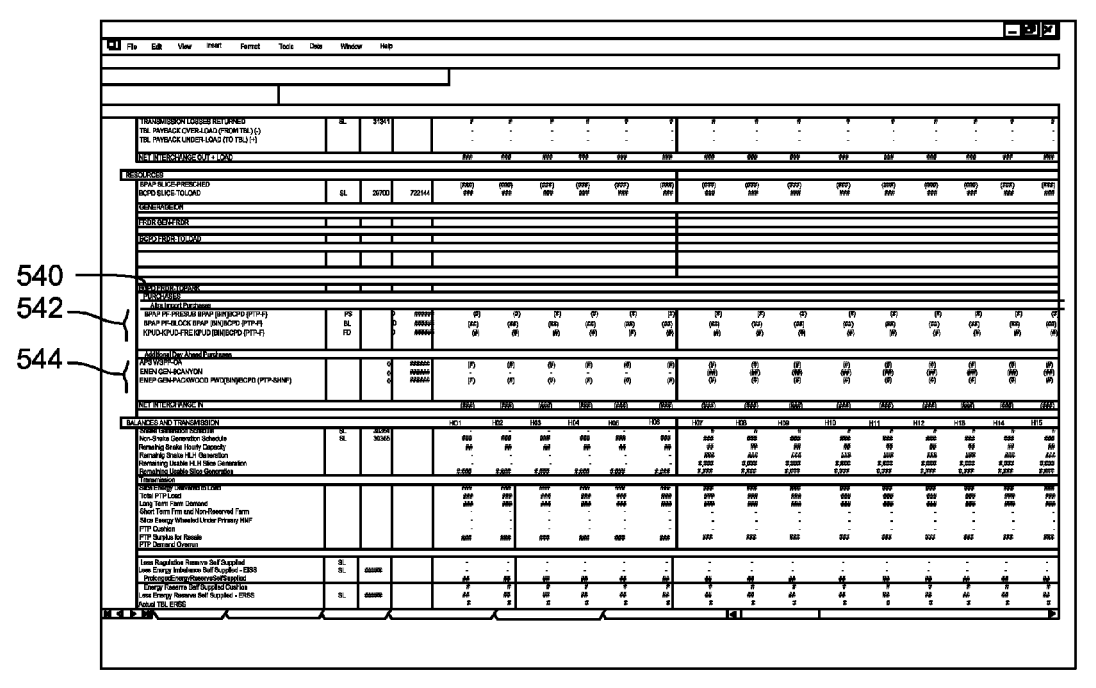

Step 6 in the pre-schedule scheduling procedure 400 enter purchase sale schedules 416 refers to FIG. 14 and more particularly to the purchase range 540. For each PRM client, long-term purchase and sales of SLICE resources have been made far in advance of the actual trading date or date of use. These purchases and sales are reflected in cell range 542 ACES import purchases. This data is the information imported in from the Power Biz database 24 which is referred to in FIG. 1. As discussed above, the Power Biz database 24 imports the long-term contracts, the day ahead transactions, and real-time transactions into the optimizer spreadsheet 1000. When the optimization is run this information is imported into the data spreadsheets 518 to 532 of FIG. 13. The particular data which we are referring to in range 542 aces import purchases is information which is referred to in the resources and obligations 524 spreadsheet, FIG. 13. After optimization is complete the day ahead scheduler can use the recommended HLH position 410 and LLH position 411 as referred to in FIG. 400, to then decide how much additional day ahead purchases or sales of the SLICE resource will take place. These purchases and sales occur as shown in range 544 additional day head purchases.

Figure 15:
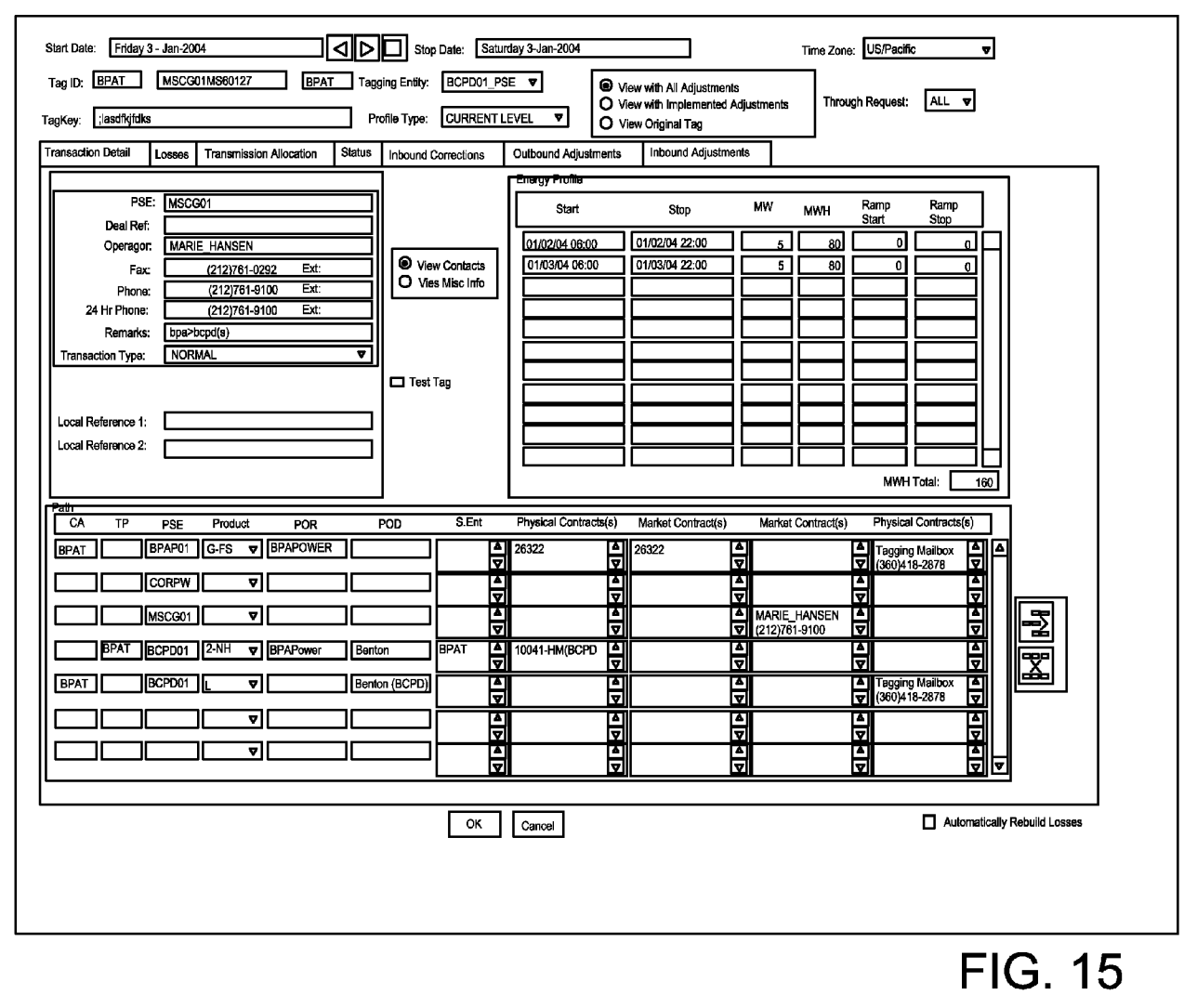

Discussing in more detail the scheduling and entering of schedule's data once the recommended optimized SLICE resources have been determined, the last step in the scheduling optimization process takes place. Referring to FIG. 400 at step 7 specified point of receipt/point of delivery and transmission 418, once the day head schedule for purchases and sales of the SLICE resources has been determined a schedule for specifying the receipt points and delivery point as well as over which routes the energy will be transmitted needs to be determined. This is generally referred to in its final form as the E-Tag schedule as discussed in FIG. 15.

Once the pre-scheduling information has been verified and imported into the various fields the optimization process can be run.

The general optimization process within the Visual Basic code is to compute the largest light load hour block that can be brought in under the minimum generation requirements, up ramp requirements, and maintain maximum load forecast within the error margins. Further, to limit the heavy load hour block sale to the surplus capacity adjusted for reserve and load forecast error margin. Lastly, limit the heavy load hour sales to not exceed the 16 hour sustained Max and target SLICE daily assuming maximum light load hour block purchases.

Referring back to FIG. 11, step 3 create diurnal buy/sell positions 408, by initializing the engage button 405 the optimization process begins.

Figure 16:
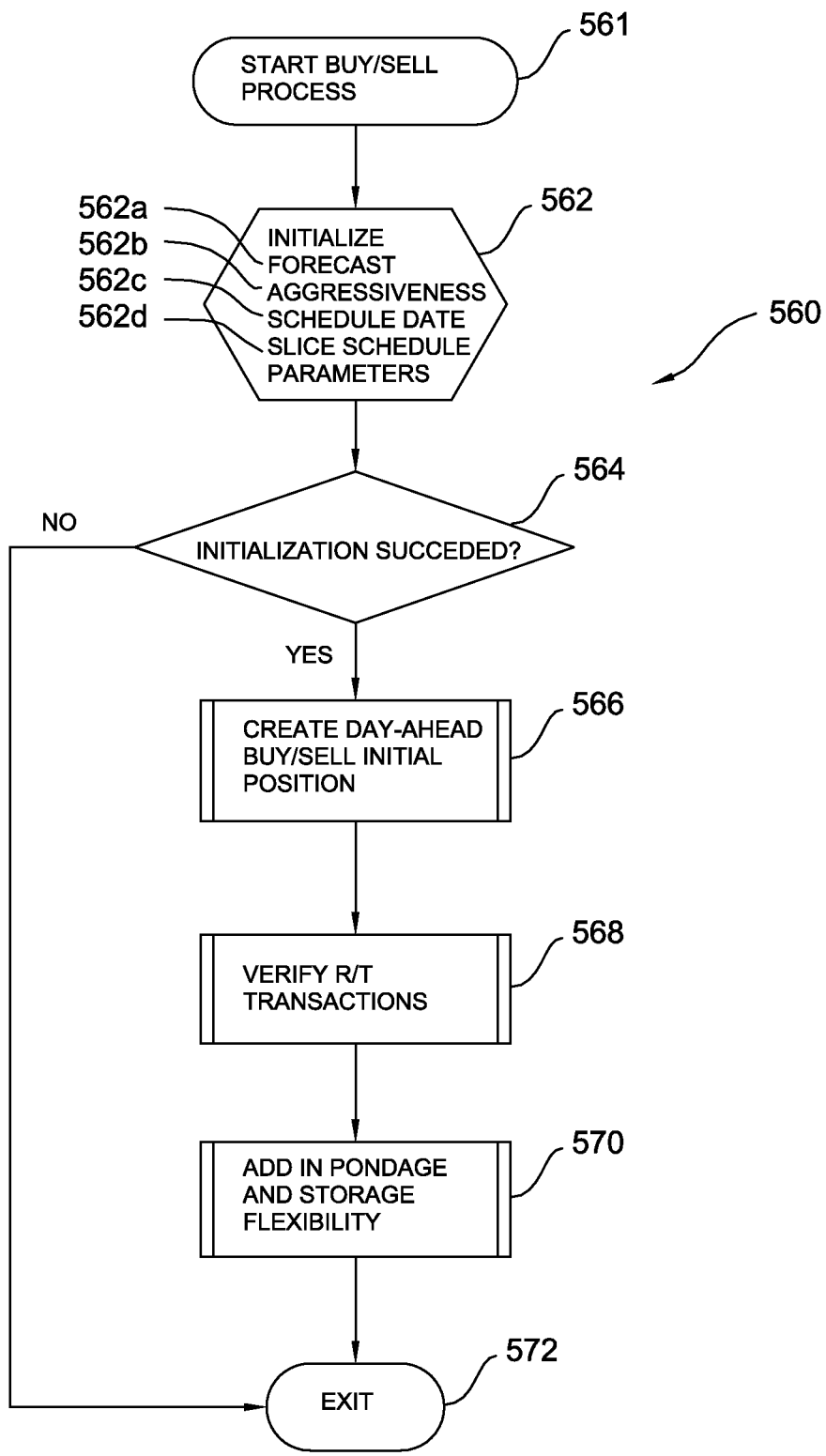
FIG. 16 is a flowchart of the overall optimization process.

Referring to FIG. 16 which shows a generalized flowchart 560 of the optimization process, the program flow chart describes the beginning of the process with start buy/sell process 561 and immediately initializes the following parameters at step 562. The parameters include the long-term forecast 562a, the aggressiveness factor 562b, the schedule date 562c, and the SLICE schedule parameters 562d.

Figure 17:
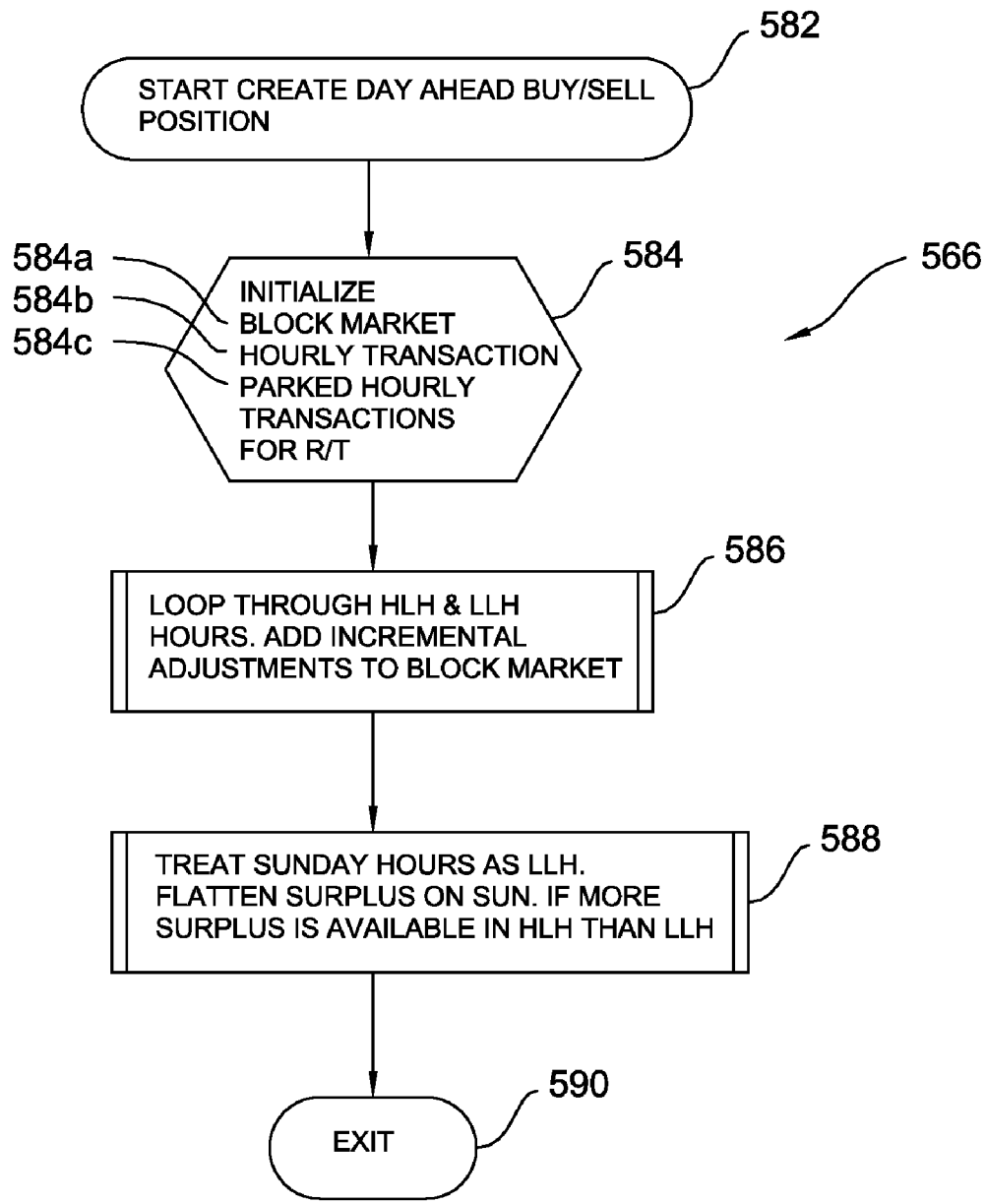
FIG. 17 is a flowchart of the create day-ahead buy/sell process.

These values are stored and referenced to in the excel spreadsheet 1000 as shown in FIG. 10 and in more detail in FIG. 22, with the Buy/Sell Component 420 which depicts the buy sell logic. Once these values are initialized the next step is to verify that the initialization succeeded at step 564. If the initialization succeeded then the program steps into the create day-ahead buy/sell initial position component 566. This component is referred to in FIG. 17.

Generally the create day-ahead buy/sell initial position 566 calculates an initial day-ahead buy/sell position from which the optimization procedure can begin. This step, Start create day ahead buy/sell position 582, initializes parameters at step 584. The parameters initialized are the block market 584a, the hourly transaction 584b, parked hourly transactions for real-time 584c. These values are entered into cells in the pre-schedule spreadsheet 1000. They are referred to in FIG. 22, buy/sell logic 420. Referring now to FIG. 22, the buy sell logic component 420, calculates the HLH action 610 and the LLH action 612. These values are interim calculations which provide temporary staged megawatt hourly values for the SLICE resource in both the heavy load hour and light load hour blocks. Essentially these cells calculate a conservative HLH and LLH value.

Figure 23:
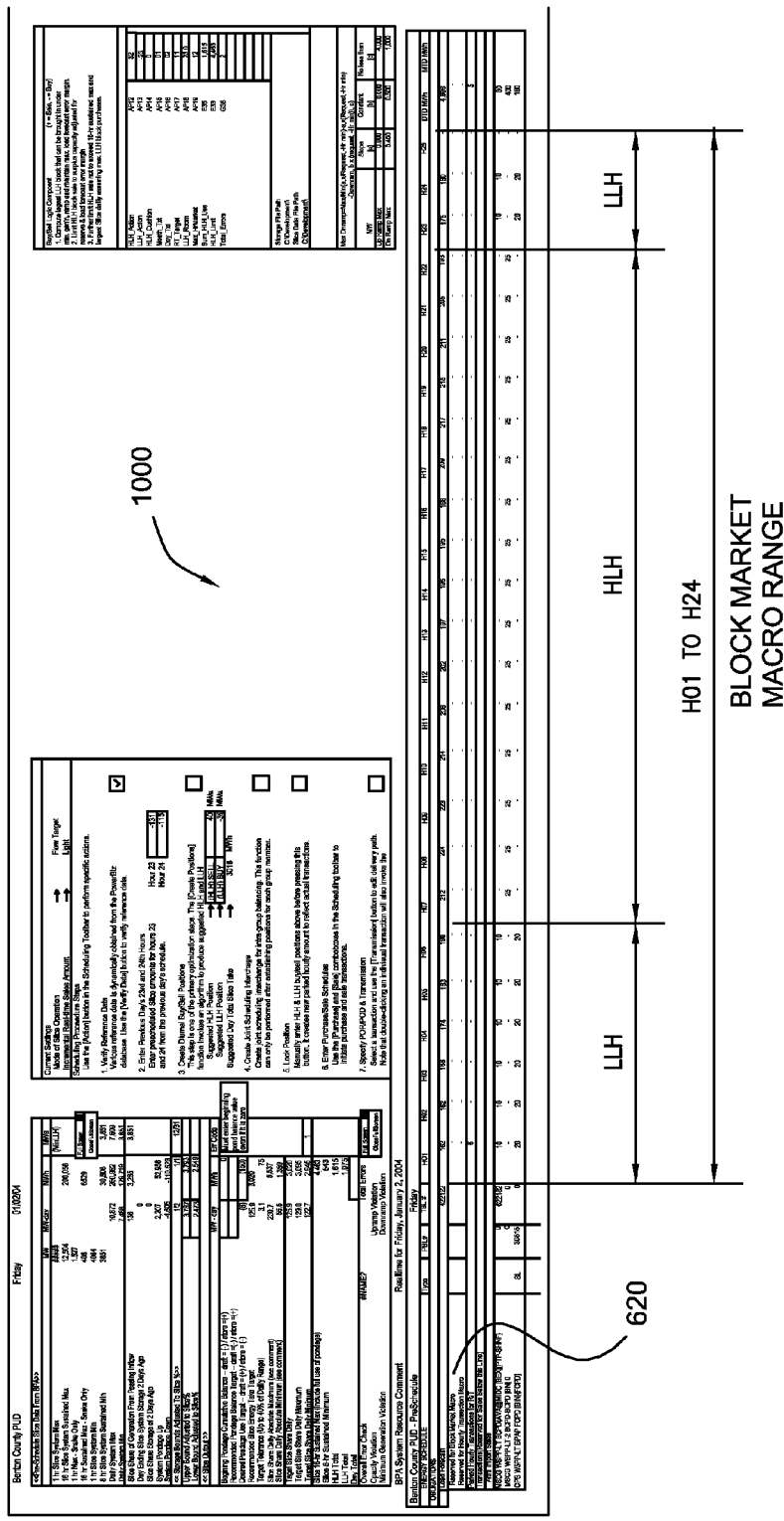
FIG. 23 is a block diagram of a load forecasting pre-schedule.
Figure 24:
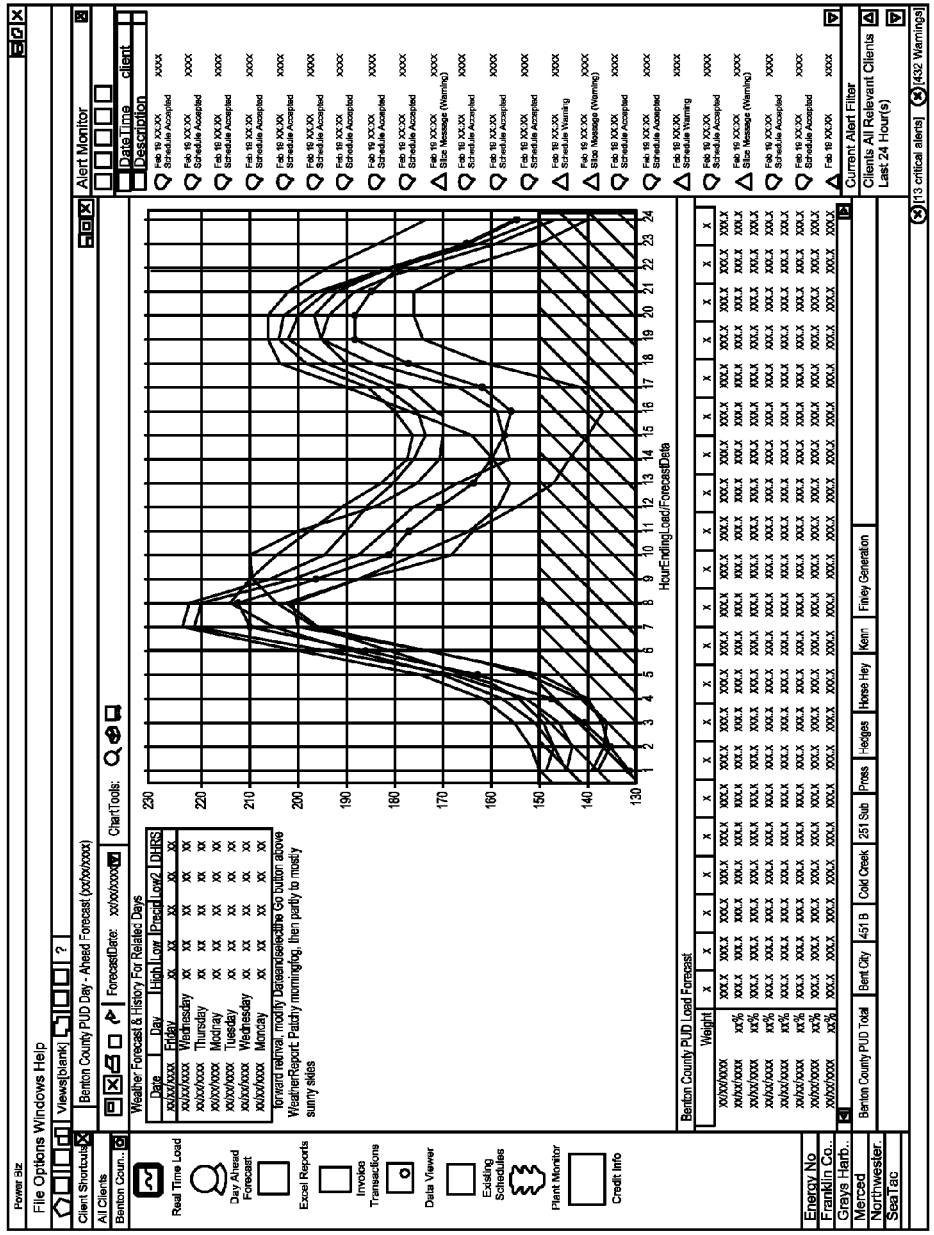
FIG. 24 is a block diagram showing an initial buy and sell block.
Figure 25:
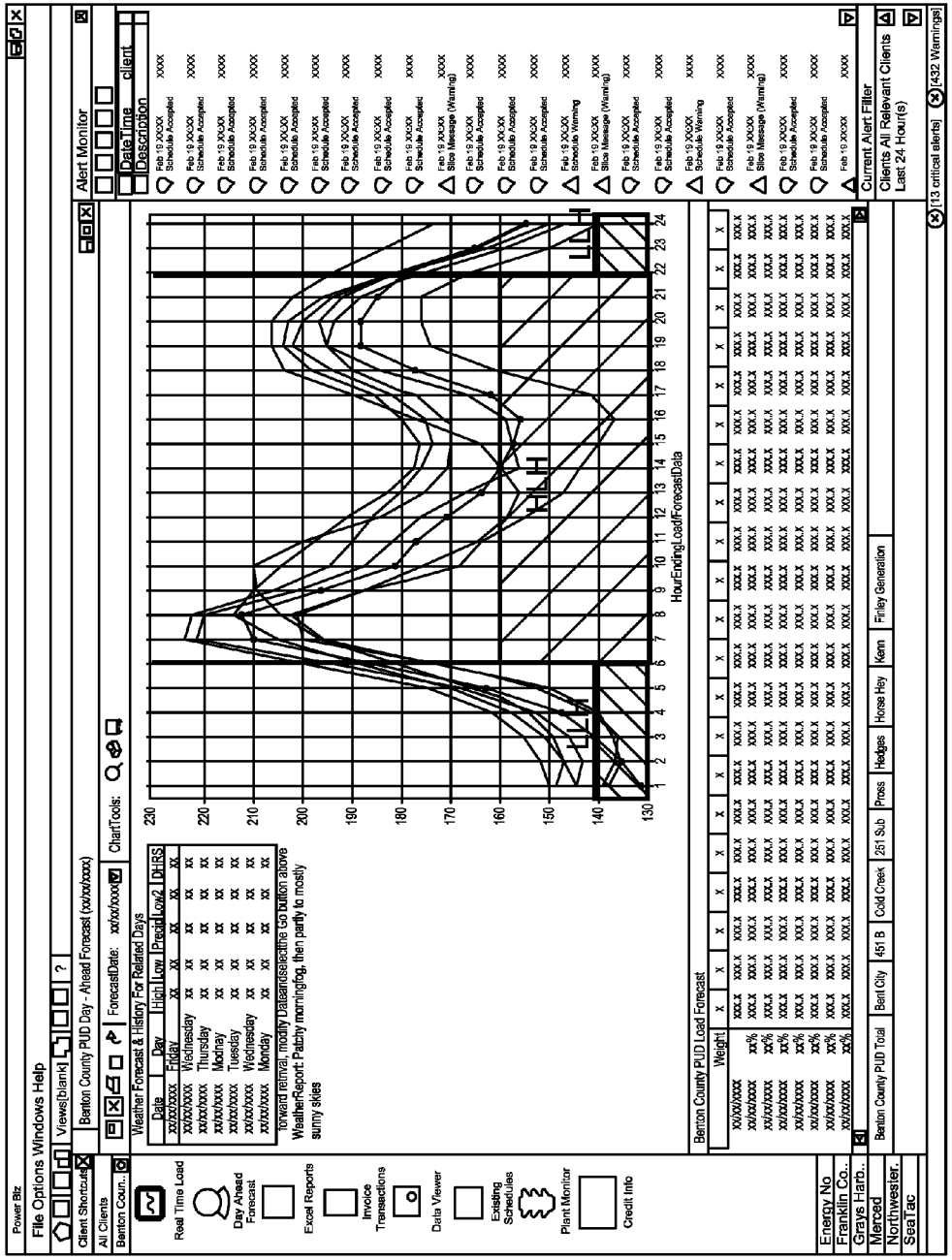
FIG. 25 is a block diagram showing allocation of transactions into the heavy load hours from the light load hours.
Figure 26:
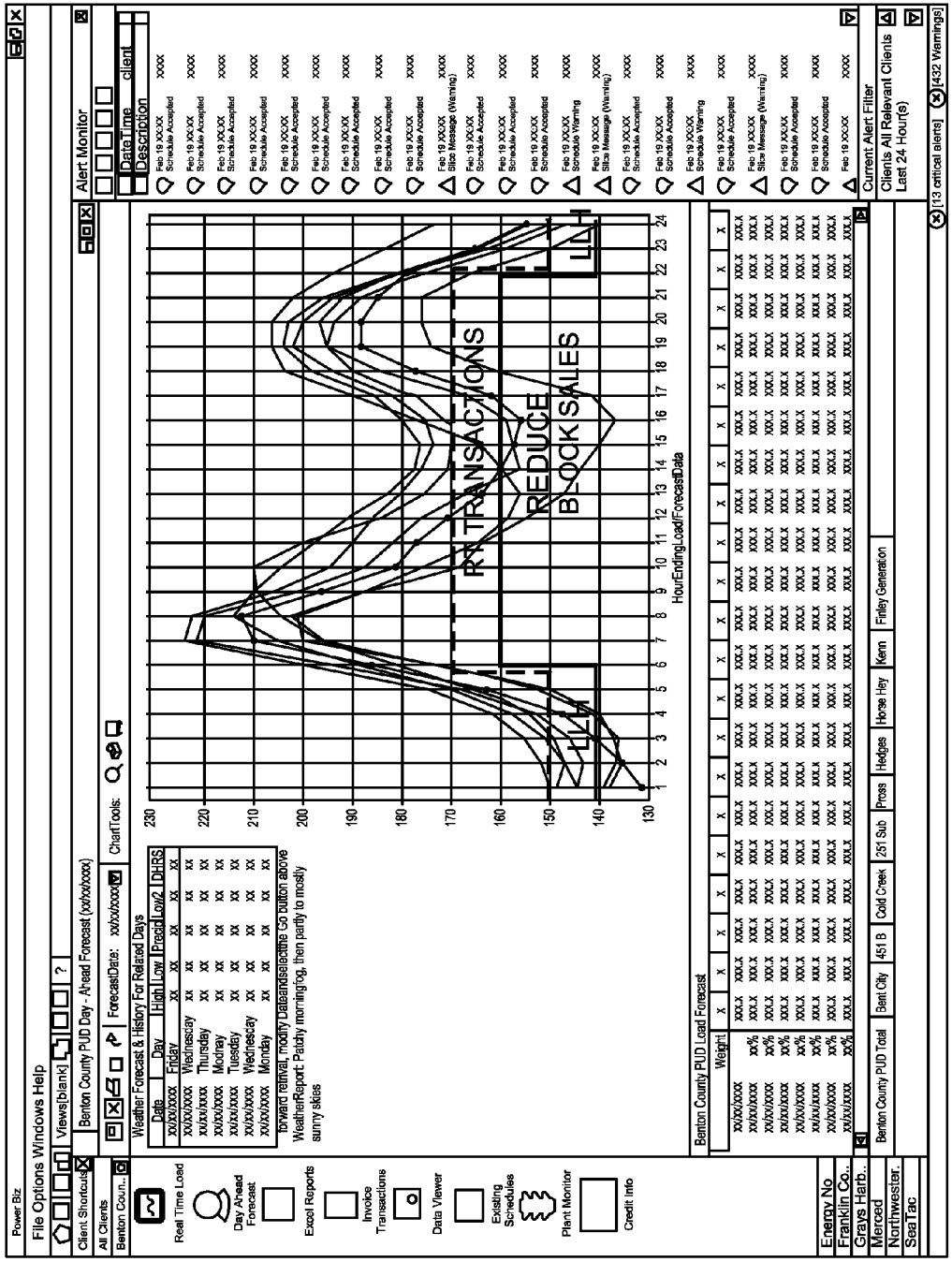
FIG. 26 is a block diagram showing the allocation of real-time transactions into the heavy load hours to buffer the pre-purchased block sales.
Figure 27:
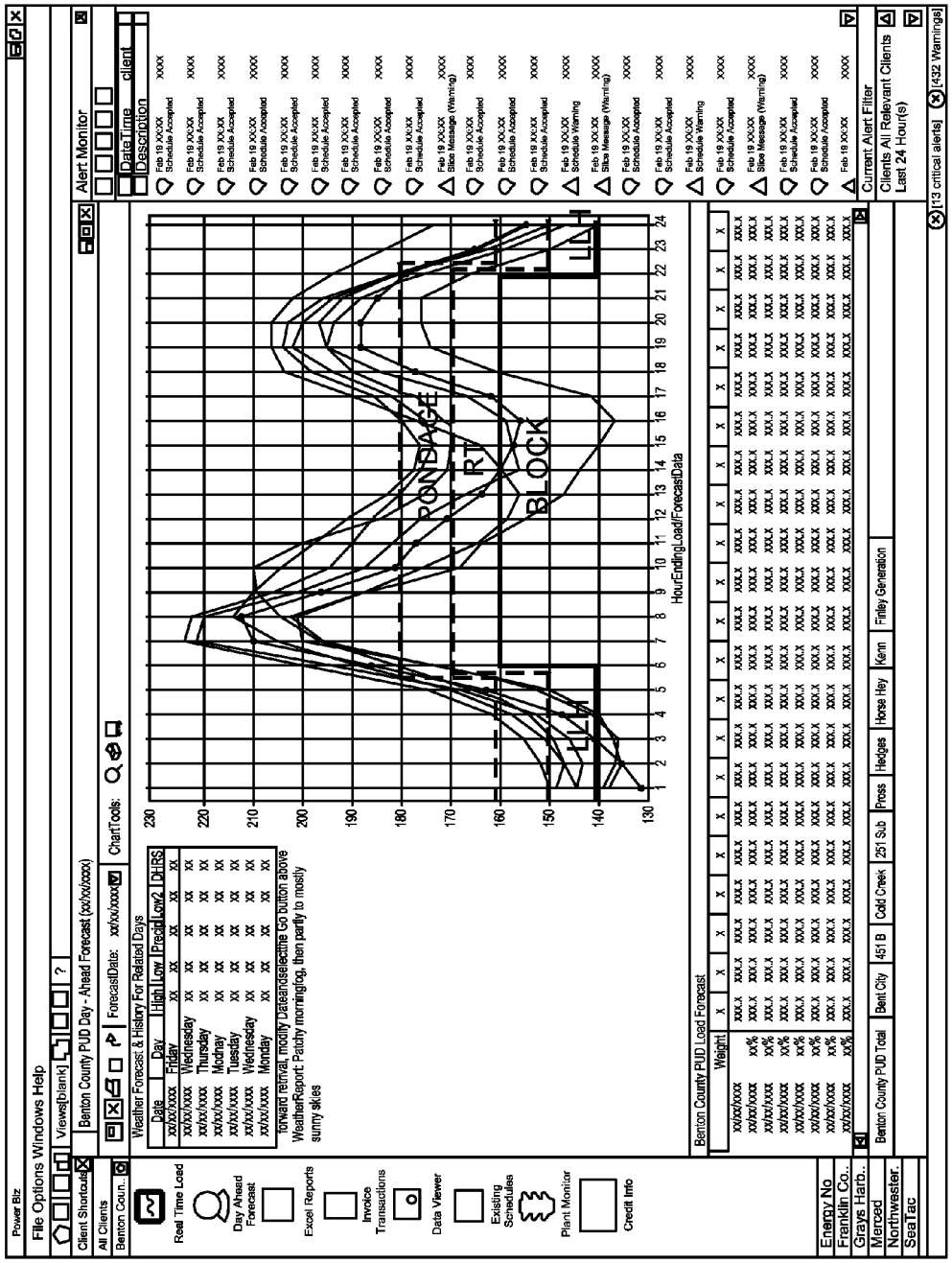
FIG. 27 is a block diagram showing the adding of pondage on top of real-time transactions in the heavy load hours.

Once the initialization procedure occurs the next step is to loop through the HLH and LLH hours for the specific day ahead and enter the HLH action and LLH action values into the Block Market Macro Range 620 shown in FIG. 23. During the loop the program adds incremental adjustments to the block market macro range 620 hour by hour. Once the values are entered into the HLH and LLH block markets, the HLH and LLH action values 610 and 612 respectively will zero out because the recommended changes to the pre-schedule spreadsheet 1000 have been made. At step 588 treat Sunday hours as LLH, the HLH action and LLH action will be summed and an average load hour value will be applied across the entire block market. The reason for evening out the SLICE block market for weekends and holidays is that the load capacity requirements are generally steady and there are not as many peaks hours which drive up the price of the SLICE resource. Consequently, maximum return for the SLICE resource is not possible during these time periods.

Once the initial HLH and LLH block markets are established create day ahead buy/sell initial position 566 exits at step 590.

Figure 18:
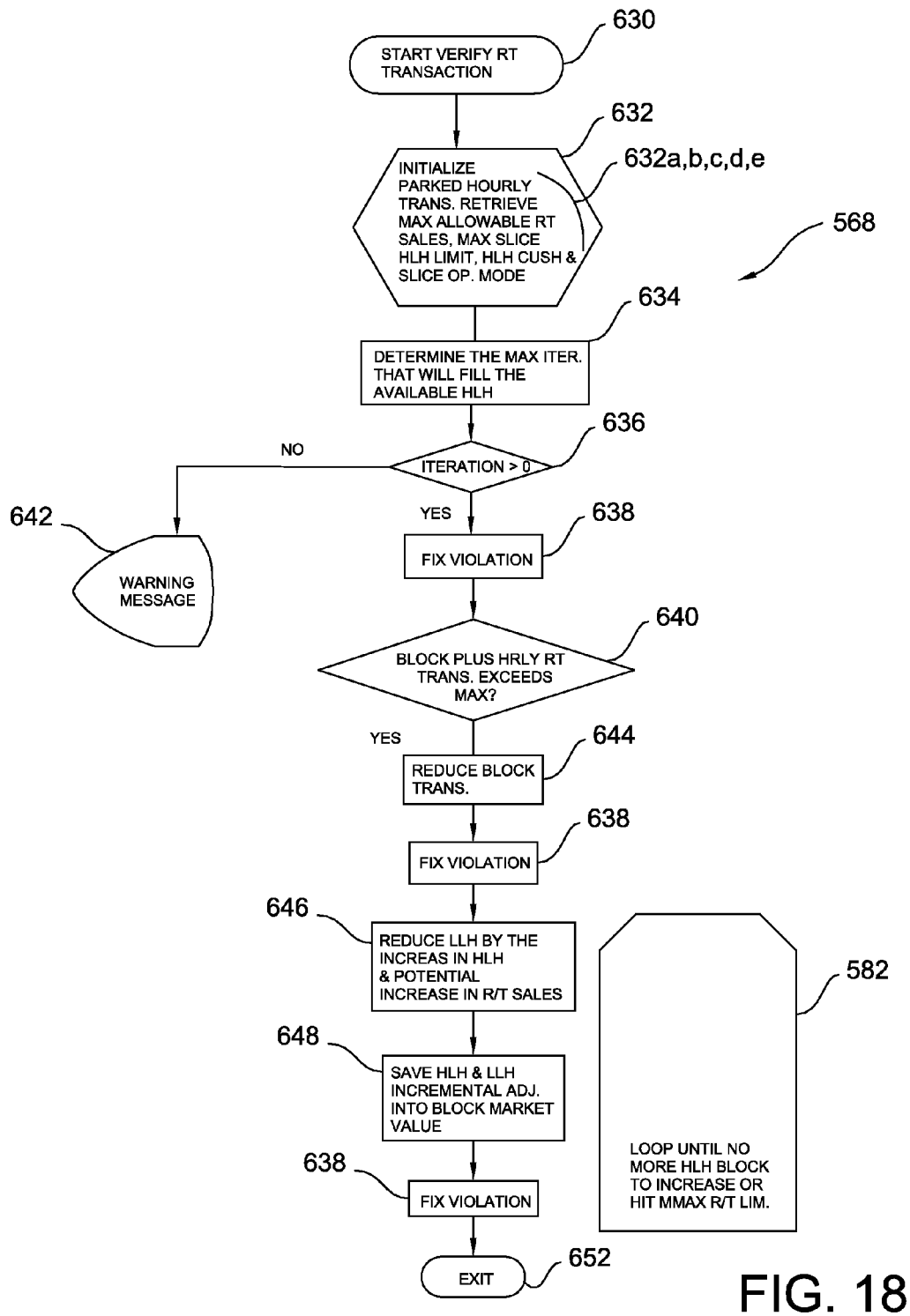
FIG. 18 is a flowchart of the verify real-time transaction process.

Referring back to FIG. 16, begin Buy/Sell process 560, once the create day ahead buy/sell initial position 566 component has been run, the verify real-time transactions component 568 is run. Referring to FIG. 18 for further detail, the intent of this component is to add-on to HLH and LLH block markets any real-time sales allocations and adjust the block markets accordingly.

With this in mind, the verify real-time transaction component begins at step 630 and various parameters are initialized at step 632. These parameters include the parked hourly transaction 632a, the maximum allowable real-time sales 632b, maximum SLICE HLH limit 632c, HLH cushion 632d, and SLICE operation mode 632e.

These values are essentially initialized into the program from various locations within the pre-schedule spreadsheet 1000. Next the program determines the maximum iteration which is required to fill the available HLH at step 634. At step 636 a decision block is encountered where if the iteration is less than or equal to zero then a warning message occurs at 642 which tells the SLICE operator that the SLICE resource will not be optimized further. If the iteration value is greater than zero then the next step in the process is too fix any violations at 638 which may occur within the overall system.

Figure 19:
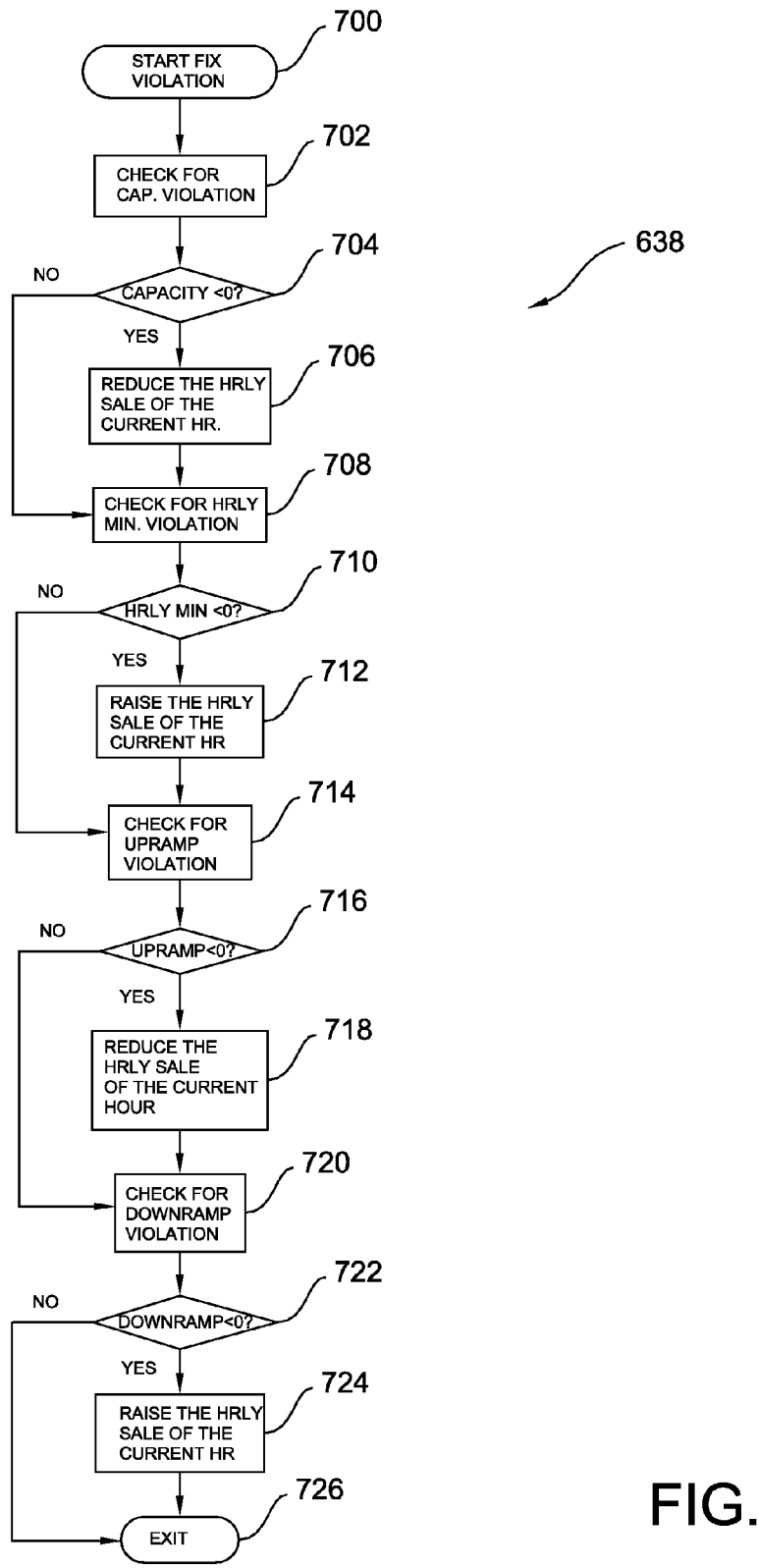
FIG. 19 is a flowchart of the fix violations process.

The fix violations component 638 is where the block markets are shaped by the optimizer to meet the transition between light load hour and heavy load hour requirements. Referring to FIG. 19 the fix violation component 638 starts at 700, and checks immediately for any SLICE resource capacity violations at step 702 within the upper and lower bounds of the BPA SLICE system requirements as discussed above. If a capacity violation is found at step 704 then the hourly sale of the current power being checked is reduced at step 706. If no capacity violation is found at step 704 then the next violation check occurs at step 708 check hourly minimum violation. If there is a hourly minimum violation found at step 710 then the process raises the hourly sale of the current hour at 712. If there is no hourly minimum violation at step 710 then a check for a ramp violations at step 714 occurs. Up ramp violations occur when the optimizer calculates the immediate use of SLICE resource such as generation capacity from a generator which does not take into account the physical limitations of starting and stopping the generator. Consequently if the up-ramp or down-ramp slope of the resource initialization is too great then a violation will occur and the resource use will need to be scaled back within tolerances. This occurs at step 714.

If the up-ramp value is less than zero at decision block 716 then the optimizer will reduce the hourly sale of the current hour at 718. If the up ramp value is greater than or equal to zero at 716 then no reduction in the hourly sale is required and an immediate check for down ramp violations occurs at 720. Additionally after any adjustment to the hourly sale at 718 procedure move to 720 check for down ramp violations.

If the down ramp value is less than zero at decision block 722 then the optimizer will raise the hourly sale of the current hour at 724 and then exit at 726. If the down ramp value is greater than or equal to zero at 722 then no adjustment to the hourly sale of the current hour is required and the optimizer exits the fix violations component at 726.

Referring back to FIG. 18 component verify real-time transactions 568, once the fix violation component 638 has been run the next step is to determine if the block market plus the hourly real-time transactions exceed the maximum SLICE boundary requirements at step 640. If they do, then the block transaction is reduced at 644. After this adjustment has been made, a violation check running the fix violation component at 638 is made. After the fix violation check 638 has been run the loop at 650 runs until no more HLH block is available to increase or until the maximum real-time limits have been met. The optimizer will reduce the available light load hours and increase the heavy load hours as well as any potential increase in real-time sales at step 646. At step 648 the HLH and LLH incremental adjustments to the block market will be saved. Lastly, at step 638 the fix violation component will be run to verify that all maximum and minimum capacities as well as ramp violations are fixed. Once the loop at 650 completes, the verify real-time transactions component 568 exits at 652.

Figure 20:
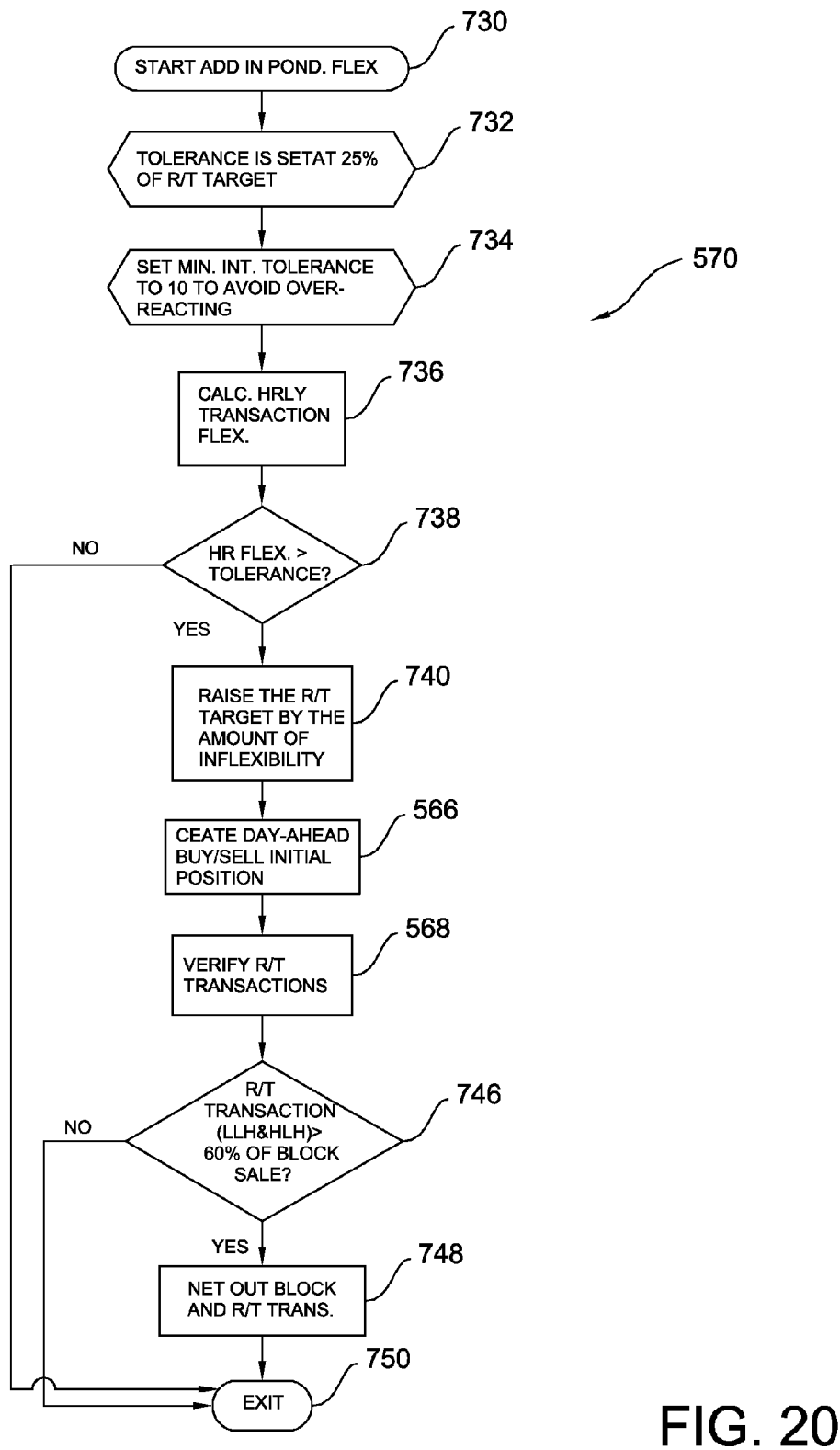
FIG. 20 is a flowchart of the adding in pondage flexibility process.
Figure 21:
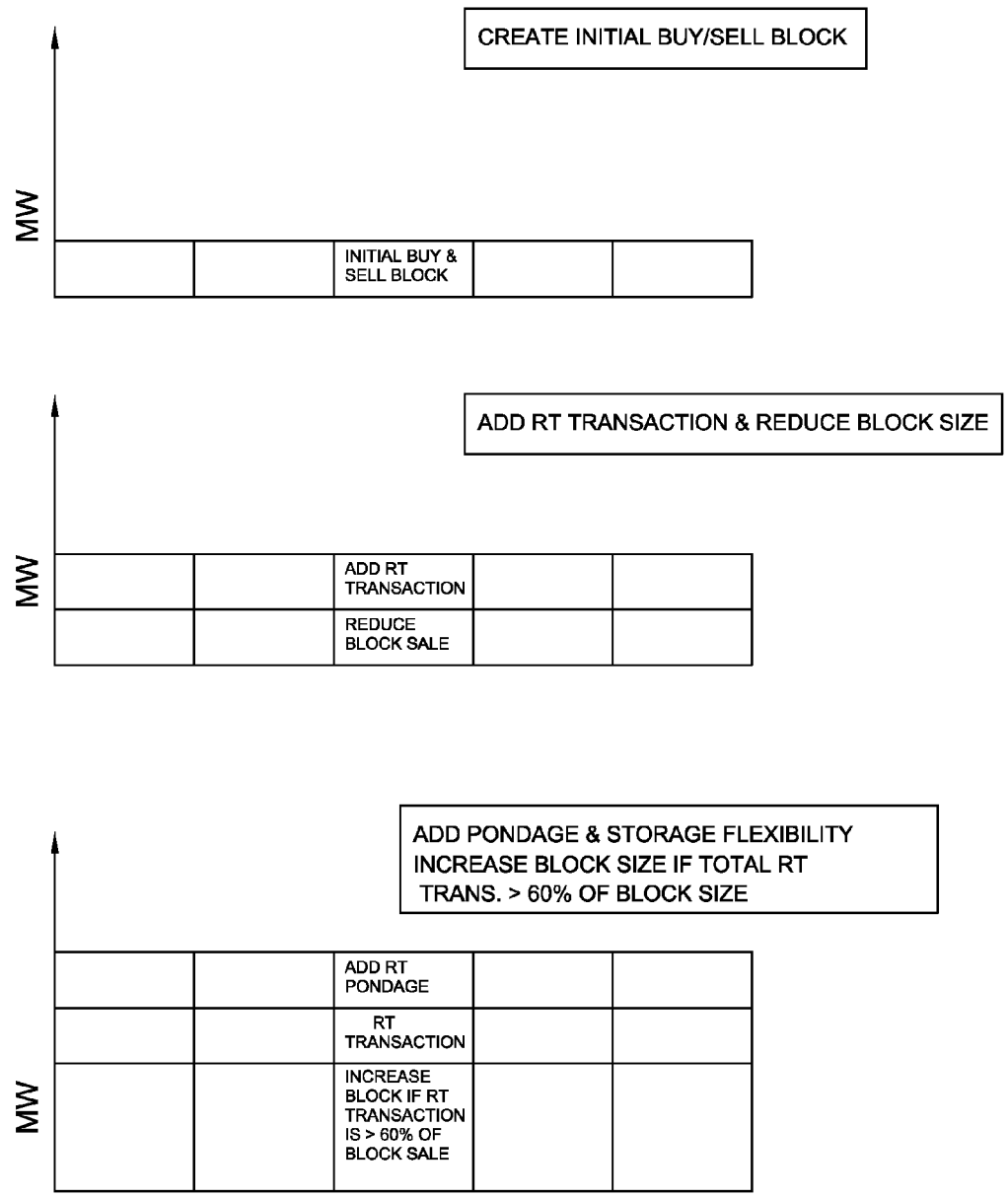
FIG. 21 is a block diagram of the buy/sell process.

Referring back to FIG. 16, begin buy/sell process 560, once the verify real-time transactions component 568 has been run, the add in pondage and storage flexibility component 570 is initialized. Referring to FIG. 20, the add in pondage and storage flexibility component 570 starts at step 730 and immediately sets a tolerance value at 25% of the real-time target at 732. An interim tolerance value is set to a minimum of 10 to avoid overreacting at step 734. Then the hourly transaction flexibility is calculated at step 736. If the hour flexibility is greater than the tolerance at step 738 then the real-time target amount is raised by the amounts of inflexibility at step 740. If the hour flexibility is less than the tolerance, then the add in pondage and storage flexibility component 570 exits at 750. Once the real-time target has been raised by the amounts of inflexibility at step 740 then the optimizer is rerun at step 566 by creating a day ahead buy/sell initial position. After this component is rerun, the verify real-time transactions component is run at 568. If the real-time transaction LLH and HLH is greater than 60% of the block then the block and real-time transactions are netted out at step 748. If the real-time transaction of LLH and HLH are less than 60% of the block sale then the add in pondage and storage flexibility component 570 exits at step 750.

Once the add in pondage and storage flexibility component 570 has completed its calculations, referring back to FIG. 16 start buy/sell process 560, will exit at step 572 and return the suggested HLH position 410 and the suggested LLH position 411 within the pre-schedule scheduling procedures component 400 as shown on FIG. 11. With these values, the pre-scheduler can purchase and sell the SLICE resources and if needed rerun the optimizer to get a new buy/sell position based on changed conditions.

I claim:

1. An optimization method for the use of utility power said method comprising:
   a. initializing a utility power load requirement forecast, an amount of available utility power, an aggressiveness position for optimizing the use of available utility power, a utility power use schedule;
   b. determining an initial utility power use position for a peak load utility power use range and a low load utility power use range;
   c. adjusting the utility power use for real-time transactions;
   d. adjusting for utility power storage flexibility;
   e. producing a utility power use schedule for optimized use of said utility power in said low load utility power use range and said peak load utility power use range.

2. The optimization method according to claim 1 wherein said determining an initial utility power use position further comprises steps of:
   a. initializing a block of pre-allocated utility power for a scheduled date range;
   b. initializing hourly transactions within said scheduled date range;
   c. initializing predetermined real-time transactions in said scheduled date range;
   d. adjusting pre-allocated utility power block into said peak load utility power use range and said low load utility power use range within said scheduled date range.

3. The optimization method according to claim 2 wherein said determining an initial utility power use position further comprises the step of: adjusting Sunday hours for the low load utility power use range.

4. The optimization method according to claim 2 wherein said determining an initial utility power use position further comprises:
   a. said low load utility power use ranges from about the beginning of hour 23 to about the end of hour 6;
   b. said peak load utility power use ranges from about the beginning of hour 7 to about the end of hour 22.

5. The optimization method according to claim 1 wherein said adjusting the utility power use for real-time transactions further comprises the steps of:
   a. initializing predetermined real-time transactions into said peak load utility power use range and said low load utility power use range;
   b. initializing predetermined maximum allowable real-time utility power use limits;
   c. initializing maximum utility power use limit for said peak load utility power use range;
   d. factoring a maximum utility power use limit cushion.

6. The optimization method according to claim 5 wherein said adjusting the utility power use for real-time transactions further comprises the steps of:

a. determining the maximum iteration to fill said peak load utility power use range;
b. performing an iteration by:
   i. fixing the utility power use for real-time transactions within said peak load utility power use range and said low load utility power use range;
   ii. determining if the utility power use for real-time transactions and a block of pre-allocated utility power as adjusted into peak load utility power use range and low load utility power use range exceeds said predetermined maximum allowable real-time utility power use limits or said maximum utility power use limits for said peak load utility power use range;
   iii. balancing said preallocated block utility power use between said low load utility power use range and said peak load utility power use range;
c. re-iterating until the utility power use is at said real-time utility power use transaction limit or said maximum utility power use limit for said peak load utility power use range.

7. The optimization method according to claim 6 wherein said fixing the utility power use for real-time transactions further comprises the steps of:
   a. checking for an hourly maximum violation of said utility power use;
   b. reducing the amount utility power use for said iteration if a maximum violation exists.

8. The optimization method according to claim 6 wherein said fixing the utility power use for real-time transactions further comprises the steps of:
   a. checking for an hourly minimum violation of said utility power use;
   b. raising the amounts of utility power use for said iteration if a minimum violation exists.

9. The optimization method according to claim 6 wherein said fixing the utility power use for real-time transactions further comprises the steps of:
   a. checking for an up ramp violation of said utility power use;
   b. reducing the utility power use for said iteration to fix said up ramp violation.

10. The optimization method according to claim 6 wherein said fixing the utility power use for real-time transactions further comprises the steps of:
    a. checking for a down ramp violation of said utility power use;
    b. raising the utility power use to fix said down ramp violation of said utility power use.

11. The optimization method according to claim 1 wherein said adjusting for utility power storage flexibility further comprises the steps of:
    a. setting a tolerance level;
    b. calculating an initial hourly transaction flexibility range;
    c. determining if said initial hourly flexible range is greater than said maximum tolerance;
    d. raising the real-time transaction level by the difference between said hourly flexibility range and said maximum tolerance.

12. The optimization method according to claim 11 wherein said setting a tolerance level further comprises: setting a maximum tolerance level to at most 25% of said real-time transactions; setting a minimum initial tolerance level to avoid overreacting.

13. A method for optimizing the use of utility power said method comprising:
    a. obtaining actionable data into an optimization system through a server;
    b. importing the actionable data into a utility power use optimization database;
    c. executing a utility power use optimization application in the optimization system to access the actionable data in the utility power use optimization database;
    d. preparing a utility power use forecast for a plurality of utility power users each having utility power load requirements;
    e. correlating the utility power use forecast with available utility power data from various utility power providers;
    f. executing an optimization method in the optimization application to optimize the use of utility power for the various utility power users;
       i. initializing a utility power load requirement forecast, an amount of available utility power, an aggressiveness position for optimizing the use of available utility power, a utility power use schedule;
       ii. determining an initial utility power use position for a peak load utility power use range and a low load utility power use range;
       iii. adjusting the utility power use for real-time transactions;
       iv. adjusting for utility power storage flexibility;
       v. adjusting said utility power use schedule for optimized use of said utility power in said low load utility power use range and said peak load utility power use range;
    g. producing said utility power use schedule based on the optimization method results.

14. The method according to claim 13 wherein said action data further comprises:
    a. utility power load requirement data from a plurality of utility power users;
    b. utility power generation data from a plurality of utility power providers;
    c. weather data;
    d. targeted source water volume power data from one or more resources.

15. The method according to claim 14 wherein said plurality of utility power providers further comprises: electric power generating facilities including hydroelectric facilities; nuclear power plants; wind energy generation facilities; fossil fuel facilities; other large-scale power producing facilities; and from other utility power users who have stored in one form or another surplus utility power.

16. The method according to claim 13 wherein said plurality of utility power users comprises: public utility districts; the school utility districts; homes; subdivisions; office parks; cities; states; industrial areas; rural areas.

17. The method according to claim 13 wherein preparing the utility power use forecast further comprises:
    a. importing from the optimization database into the optimization application forecasted and historical weather satellite data;
    b. selecting from a list of scheduled days in the optimization application a candidate utility power use day to be forecasted;
    c. comparing the candidate utility power use day's expected weather forecast with at least one other historical weather data day having similar weather characteristics and/or seasonal characteristics;
    d. providing historical utility power load requirement data for at least one of said historical weather data days;
    e. utilizing the historical utility power load requirement for at least one of said historical weather data days to model the candidate utility power day's utility power load requirement data.

18. The method according to claim 13 wherein said determining an initial utility power use position further comprises steps of:
   a. initializing a block of pre-allocated utility power for a scheduled date range;
   b. initializing hourly transactions within said scheduled date range;
   c. initializing predetermined real-time transactions in said scheduled date range;
   d. adjusting pre-allocated utility power block into said peak load utility power use range and said low load utility power use range within said scheduled date range.

19. The method according to claim 13 said determining an initial utility power use position further comprises the step of: adjusting Sunday hours for the low load utility power use range.

20. The method according to claim 19 wherein said determining an initial utility power use position further comprises:
   a. said low load utility power use range is from about the beginning of hour 23 to about the end of hour 6;
   b. said peak load utility power use range is from about the beginning of hour 7 to about the end of hour 22.

21. The method according to claim 13 said adjusting the utility power use for real-time transactions further comprises the steps of:
   a. initializing predetermined real-time transactions into said peak load utility power use range and said low load utility power use range;
   b. initializing predetermined maximum allowable real-time utility power use limits;
   c. initializing maximum utility power use limit for said peak load utility power use range;
   d. factoring a maximum utility power use limit cushion.

22. The method according to claim 21 wherein said adjusting the utility power use for real-time transactions further comprises the steps of:
   a. determining the maximum iteration to fill said peak load utility power use range;
   b. performing an iteration by:
      i. fixing the utility power use for real-time transactions within said peak load utility power use range and said low load utility power use range;
      ii. determining if the utility power use for real-time transactions and a block of pre-allocated utility power as adjusted into peak load utility power use range and low load utility power use range exceeds said predetermined maximum allowable real-time utility power use limits or said maximum utility power use limits for said peak load utility power use range;
      iii. balancing said preallocated block utility power use between said low load utility power use range and said peak load utility power use range;
   c. re-iterating until the utility power use is at said real-time utility power use transaction limit or said maximum utility power use limit for said peak load utility power use range.

23. A method for optimizing utilization of electric power for a plurality of electric power users, said electric power provided from electric power providers such as electric power generating facilities including hydroelectric facilities, nuclear power plants, wind energy generation facilities, fossil fuel facilities, other large-scale power producing facilities, and from other electric power users who have stored in one form or another surplus electrical power, said method comprising:
   a. obtaining actionable data comprising at least one or more of the following:
      i. electrical load requirement data from a plurality of electric power users;
      ii. electric power generation data from said electric power providers;
      iii. weather data;
      iv. targeted source water volume power data from one or more resources;
   b. importing the actionable data into an electrical power optimization database;
   c. executing a power optimization application resident in the optimization database to access the obtained data in the power optimization database;
   d. preparing a forecast of the electrical load requirements for the various users utilizing the weather satellite data and electrical load requirement data;
   e. correlating the forecasted electrical load requirements for the various electric power users with the available electrical power data from the various electrical power providers;
   f. executing an optimization process in the optimization application to optimize the electrical power use of the various electric power users by:
      i. utilizing the correlated forecasted electrical load requirement data and available electric power data to determine a day-ahead electrical power utilization position;
      ii. allocating electrical power into either a peak load use range or a low load use range;
      iii. using the actionable data to determine a maximum electrical power use violation level and a minimum electrical power use violation level;
      iv. allocating a certain amount of electrical power to be used for real-time open market use;
      v. correlating the used electrical power with the forecasted electrical load requirements to adjust for electrical power storage flexibility;
   g. producing a schedule based on the optimization of electrical power which maximizes and/or minimizes the usage of the power for various users;
   h. communicating the schedule back to the electrical power providers for scheduling of electrical power use for the various electrical power users.

24. The method according to claim 23 wherein an electrical power provider further comprises a regional power authority which allocates the distribution of power to the various public and private power users.

25. The method according to claim 23 wherein the energy products include an energy entitlement system or contract where a participant or contractor of electrical power has an entitlement to a certain percentage of an electrical power provider's output.

26. The method according to claim 23 wherein preparing the forecast of electrical load requirement data further comprises:
   a. importing from the optimization database into the optimization application forecasted and historical weather satellite data;
   b. selecting from a list of scheduled days in the optimization application a candidate electrical power use day to be forecasted;
   c. comparing in the optimization application the candidate electrical power use day's expected weather forecast with at least one other historical weather data day having similar weather characteristics and/or seasonal characteristics;

d. providing the historical electrical load requirement data for at least one of said historical weather data days;
e. utilizing in the optimization application the historical electrical load requirement for at least one of said historical weather data days to model the candidate electrical power day's electrical load requirement data.

27. A method for optimizing utilization of electric power for a plurality of electric power users, said electric power provided from electric power providers such as electric power generating facilities including hydroelectric facilities, nuclear power plants, wind energy generation facilities, fossil fuel facilities, other large-scale power producing facilities, and from other electric power users who have stored in one form or another surplus electrical power, said method comprising:

a. obtaining actionable data comprising at least one or more of the following:
   i. electrical load requirement data from a plurality of electric power users;
   ii. electric power generation data from said electric power providers;
   iii. weather forecast data and weather history data;
   iv. targeted source water volume power data from one or more resources;
b. importing the actionable data into an electrical power optimization database;
c. executing a power optimization application resident in the optimization database to access the obtained data in the power optimization database;
d. preparing a forecast of the electrical load requirements for the various users utilizing the weather satellite data and electrical load requirement data and further comprising:
   i. importing from the optimization database into the optimization application forecasted and historical weather satellite data;
   ii. selecting from a list of scheduled days in the optimization application a candidate electrical power use day to be forecasted;
   iii. comparing in the optimization application the candidate electrical power use day's expected weather forecast with at least one other historical weather data day having similar weather characteristics and/or seasonal characteristics;
   iv. providing the historical electrical load requirement data for at least one of said historical weather data days;
   v. utilizing in the optimization application the historical electrical load requirement for at least one of said historical weather data days to model the candidate electrical power day's electrical load requirement data;
e. correlating the forecasted electrical load requirements for the various electric power users with the available electrical power data from the various electrical power providers;
f. executing an optimization process in the optimization application to optimize the electrical power use of the various electric power users by:
   i. utilizing the correlated forecasted electrical load requirement data and available electric power data to determine a day-ahead electrical power utilization position;
   ii. allocating electrical power into either a peak load use range or a low load use range;
   iii. using the actionable data to determine a maximum electrical power use violation level and a minimum electrical power use violation level;
   iv. allocating a certain amount of electrical power to be used for real-time open market use;
   v. correlating the used electrical power with the forecasted electrical load requirements to adjust for electrical power storage flexibility;
g. producing a schedule based on the optimization of electrical power which maximizes and/or minimizes the usage of the power for various users;
h. communicating the schedule back to the electrical power providers for scheduling of electrical power use for the various electrical power users.

28. A method for optimizing utilization of electric power for a plurality of electric power users, said electric power provided from electric power providers such as electric power generating facilities including hydroelectric facilities, nuclear power plants, wind energy generation facilities, fossil fuel facilities, other large-scale power producing facilities, and from other electric power users who have stored in one form or another surplus electrical power, said method comprising:

a. obtaining actionable data comprising at least one of the following:
   i. electrical load requirement data from a plurality of electric power users;
   ii. electric power generation data from said electric power providers;
   iii. weather data;
   iv. targeted source water volume power data from one or more resources;
b. importing the actionable data into an electrical power optimization database;
c. executing a power optimization application resident in the optimization database to access the obtained data in the power optimization database;
d. preparing a forecast of the electrical load requirements for the various users utilizing the weather satellite data and electrical load requirement data;
e. correlating the forecasted electrical load requirements for the various electric power users with the available electrical power data from the various electrical power providers;
f. executing an optimization process in the optimization application to optimize the electrical power use of the various electric power users by:
   i. utilizing the correlated forecasted electrical load requirement data and available electric power data to determine a day-ahead electrical power utilization position;
   ii. allocating electrical power into either a peak load use range or a low load use range;
   iii. using the actionable data to determine a maximum electrical power use violation level and a minimum electrical power use violation level;
   iv. allocating a certain amount of electrical power to be used for real-time open market use;
   v. correlating the used electrical power with the forecasted electrical load requirements to adjust for electrical power storage flexibility;
g. producing a schedule based on the optimization of electrical power which maximizes and/or minimizes the usage of the power for various users;
h. communicating the schedule back to the electrical power providers for scheduling of electrical power use for the various electrical power users.

29. A system to optimize the use of utility power said system comprising:
   a. a server to obtain actionable data for an optimization system;
   b. a utility power use optimization database to import and retain said actionable data;
   c. a utility power use optimization application within said optimization system which utilizes said actionable data and said utility power use optimization database;
   d. a forecast component to prepare a forecasted utility power load for one or more utility power users;
   e. a correlation component to compare said forecasted utility power load with available utility power supply from various utility power providers;
   f. an optimization component to optimize the scheduled use of utility power for the various utility power users;
      i. said optimization component initializing a utility power load requirement forecast, an amount of available utility power, an aggressiveness position for optimizing the use of available utility power, a utility power use schedule;
      ii. means for determining an initial utility power use position for a peak load utility power use range and a low load utility power use range;
      iii. means for adjusting the utility power use for real-time transactions;
      iv. means for adjusting for utility power storage flexibility;
      v. means for adjusting said utility power use schedule for optimized use of said utility power in said low load utility power use range and said peak load utility power use range;
   g. a schedule component operating from said optimization component to produce said utility power use schedule based on the optimization component results for the various utility power users.

30. The system according to claim 29 wherein said action data further comprises:
   a. utility power load requirement data from a plurality of utility power users;
   b. utility power generation data from a plurality of utility power providers;
   c. weather data;
   d. targeted source water volume power data from one or more resources.

31. The system according to claim 30 wherein said plurality of utility power providers further comprises: electric power generating facilities including hydroelectric facilities; nuclear power plants; wind energy generation facilities; fossil fuel facilities; other large-scale power producing facilities; and from other utility power users who have stored in one form or another surplus utility power.

32. The system according to claim 30 were said plurality of utility power users comprises: public utility districts; the school utility districts; homes; subdivisions; office parks; cities; states; industrial areas; rural areas.

33. The system according to claim 29 wherein said forecast component further comprises:
   a. means for importing from the optimization database into the optimization application forecasted and historical weather satellite data;
   b. means for selecting from a list of scheduled days in the optimization application a candidate utility power use day to be forecasted;
   c. means for comparing the candidate utility power use day's expected weather forecast with at least one other historical weather data day having similar weather characteristics and/or seasonal characteristics;
   d. means for providing historical utility power load requirement data for at least one of said historical weather data days;
   e. means for utilizing the historical utility power load requirement for at least one of said historical weather data days to model the candidate utility power day's utility power load requirement data.

34. The system according to claim 29 wherein said means for determining an initial utility power use position further comprises:
   a. means for initializing a block of pre-allocated utility power for a scheduled date range;
   b. means for initializing hourly transactions within said scheduled date range;
   c. means for initializing predetermined real-time transactions in said scheduled date range;
   d. means for adjusting pre-allocated utility power block into said peak load utility power use range and said low load utility power use range within said scheduled date range.

35. The system according to claim 34 wherein said means for determining an initial utility power use position further comprises the step of: means for adjusting Sunday hours for the low load utility power use range.

36. The system according to claim 35 wherein said means for determining an initial utility power use position further comprises:
   a. said low load utility power use ranges from about the beginning of hour 23 to about the end of hour 6;
   b. said peak load utility power use range is from about the beginning of hour 7 to about the end of hour 22.

37. The system according to claim 29 wherein said means for adjusting the utility power use for real-time transactions further comprises the steps of:
   a. means for initializing predetermined real-time transactions into said peak load utility power use range and said low load utility power use range;
   b. means for initializing predetermined maximum allowable real-time utility power use limits;
   c. means for initializing maximum utility power use limit for said peak load utility power use range;
   d. means for factoring a maximum utility power use limit cushion.

38. The system according to claim 37 wherein said means for adjusting the utility power use for real-time transactions further comprises the steps of:
   a. means for determining the maximum iteration to fill said peak load utility power use range;
   b. means for performing an iteration including:
      i. means for fixing the utility power use for real-time transactions within said peak load utility power use range and said low load utility power use range;
      ii. means for determining if the utility power use for real-time transactions and a block of pre-allocated utility power as adjusted into peak load utility power use range and low load utility power use range exceeds said predetermined maximum allowable real-time utility power use limits or said maximum utility power use limits for said peak load utility power use range;
      iii. means for balancing said preallocated block utility power use between said low load utility power use range and said peak load utility power use range;

c. means for re-iterating until the utility power use is at said real-time utility power use transaction limit or said maximum utility power use limit for said peak load utility power use range.

39. A system for optimizing the use of utility power said system comprising:
- a. means for obtaining actionable data into an optimization system through a server;
- b. means for importing the actionable data into a utility power use optimization database;
- c. means for executing a utility power use optimization application in the optimization system to access the actionable data in the utility power use optimization database;
- d. means for preparing a utility power use forecast for a plurality of utility power users each having utility power load requirements;
- e. means for correlating the utility power use forecast with available utility power data from various utility power providers;
- f. means for executing an optimization method in the optimization application to optimize the use of utility power for the various utility power users;
  - i. means for initializing a utility power load requirement forecast, an amount of available utility power, an aggressiveness position for optimizing the use of available utility power, a utility power use schedule;
  - ii. means for determining an initial utility power use position for a peak load utility power use range and a low load utility power use range;
  - iii. means for adjusting the utility power use for real-time transactions;
  - iv. means for adjusting for utility power storage flexibility;
  - v. means for adjusting said utility power use schedule for optimized use of said utility power in said low load utility power use range and said peak load utility power use range;
- g. means for producing said utility power use schedule based on the optimization method results.

\* \* \* \* \*